US010466844B1

(12) United States Patent
Tang et al.

(10) Patent No.: US 10,466,844 B1
(45) Date of Patent: Nov. 5, 2019

(54) ULTRASONIC TOUCH AND FORCE INPUT DETECTION

(71) Applicant: UltraSense Systems, Inc., Santa Clara, CA (US)

(72) Inventors: Hao-Yen Tang, San Jose, CA (US); Mo Maghsoudnia, San Jose, CA (US); Man-Chia Chen, Palo Alto, CA (US)

(73) Assignee: UltraSense Systems, Inc., San Jose, CA (US)

( * ) Notice: Subject to any disclaimer, the term of this patent is extended or adjusted under 35 U.S.C. 154(b) by 0 days.

(21) Appl. No.: 16/396,597

(22) Filed: Apr. 26, 2019

Related U.S. Application Data

(60) Provisional application No. 62/674,317, filed on May 21, 2018, provisional application No. 62/725,697, filed on Aug. 31, 2018.

(51) Int. Cl.
| | |
|---|---|
| *G06F 3/043* | (2006.01) |
| *G06F 3/041* | (2006.01) |
| *B25J 13/08* | (2006.01) |
| *H04M 1/02* | (2006.01) |
| *B62D 1/04* | (2006.01) |
| *B60K 37/06* | (2006.01) |

(52) U.S. Cl.
CPC .......... *G06F 3/0436* (2013.01); *B25J 13/084* (2013.01); *G06F 3/0416* (2013.01); *H04M 1/026* (2013.01); *B60K 37/06* (2013.01); *B60K 2370/1446* (2019.05); *B62D 1/046* (2013.01)

(58) Field of Classification Search
CPC ..... G06F 3/0436; G06F 3/0416; B60K 37/06; B60K 2370/1446; H04M 1/026; B25J 13/084; B62D 1/046
See application file for complete search history.

(56) References Cited

U.S. PATENT DOCUMENTS

| | | |
|---|---|---|
| 4,412,544 A | 11/1983 | Beretsky et al. |
| 8,676,540 B1 | 3/2014 | Welch et al. |
| 2001/0000666 A1 | 5/2001 | Wood et al. |

(Continued)

FOREIGN PATENT DOCUMENTS

WO 2018077761 A1 5/2018

OTHER PUBLICATIONS

U.S. Appl. No. 16/417,184, Non-Final Office Action dated Jul. 1, 2019, 18 pages.

(Continued)

*Primary Examiner* — Ryan A Lubit
(74) *Attorney, Agent, or Firm* — Kilpatrick Townsend & Stockton LLP

(57) ABSTRACT

Touch events can be detected using an ultrasound input device coupled to a surface, such as a surface of a piece of furniture or electronic device. The ultrasound input device can generate ultrasonic waves in the surface, the reflections of which can be measured by the ultrasound input device. When a touch is made to the surface (e.g., opposite the ultrasound input device), the physical contact can absorb some of the energy of the outgoing ultrasonic waves (e.g., the originally transmitted wave and any subsequent outgoing reflections). Energy measurements associated with the measured reflections can thus be used to identify touch events. Various techniques can be used to make the energy measurements and reduce identification of false touch events.

30 Claims, 30 Drawing Sheets

(56) References Cited

U.S. PATENT DOCUMENTS

| | | | |
|---|---|---|---|
| 2002/0005108 A1* | 1/2002 | Ludwig | G10H 1/00 84/600 |
| 2003/0144814 A1 | 7/2003 | Hama et al. | |
| 2003/0217873 A1 | 11/2003 | Paradiso et al. | |
| 2003/0233233 A1 | 12/2003 | Hong | |
| 2007/0260425 A1 | 11/2007 | Kim | |
| 2008/0316184 A1 | 12/2008 | D'Souza | |
| 2009/0157206 A1 | 6/2009 | Weinberg et al. | |
| 2009/0224161 A1 | 9/2009 | Fritsch et al. | |
| 2010/0117993 A1* | 5/2010 | Kent | G06F 3/0418 345/177 |
| 2010/0139991 A1 | 6/2010 | Philipp et al. | |
| 2010/0258361 A1 | 10/2010 | Yamauchi et al. | |
| 2011/0061464 A1 | 3/2011 | Yi-Min | |
| 2012/0274609 A1 | 11/2012 | Sheng et al. | |
| 2013/0345864 A1 | 12/2013 | Park | |
| 2014/0022189 A1 | 1/2014 | Sheng et al. | |
| 2014/0071095 A1 | 3/2014 | Godsill | |
| 2015/0148674 A1 | 5/2015 | Park et al. | |
| 2015/0169136 A1 | 6/2015 | Ganti et al. | |
| 2016/0246449 A1 | 8/2016 | Jarske | |
| 2017/0110504 A1 | 4/2017 | Panchawagh et al. | |
| 2017/0255338 A1* | 9/2017 | Medina | G06F 3/0416 |
| 2017/0322290 A1 | 11/2017 | Ng et al. | |
| 2017/0336926 A1 | 11/2017 | Chaudhri et al. | |
| 2018/0032211 A1* | 2/2018 | King | G06F 1/1694 |
| 2018/0164937 A1* | 6/2018 | Lynn | G06F 3/0414 |
| 2018/0246612 A1 | 8/2018 | Lynn et al. | |
| 2018/0276440 A1 | 9/2018 | Strohmann et al. | |
| 2019/0050618 A1* | 2/2019 | Khuri-Yakub | G06F 3/0436 |
| 2019/0074833 A1* | 3/2019 | Sheng | H03K 17/964 |

OTHER PUBLICATIONS

U.S. Appl. No. 16/418,180, Non-Final Office Action dated Jul. 12, 2019, 14 pages.

International Patent Application No. PCT/US2019/033366, Invitation to Pay Additional Fees and, Where Applicable, Protest Fee, Jul. 3, 2019, 2 pages.

U.S. Appl. No. 16/418,410, Non-Final Office Action dated Aug. 26, 2019, 15 pages.

International Patent Application No. PCT/US2019/033366, International Search Report and Written Opinion dated Sep. 13, 2019, 17 pages.

* cited by examiner

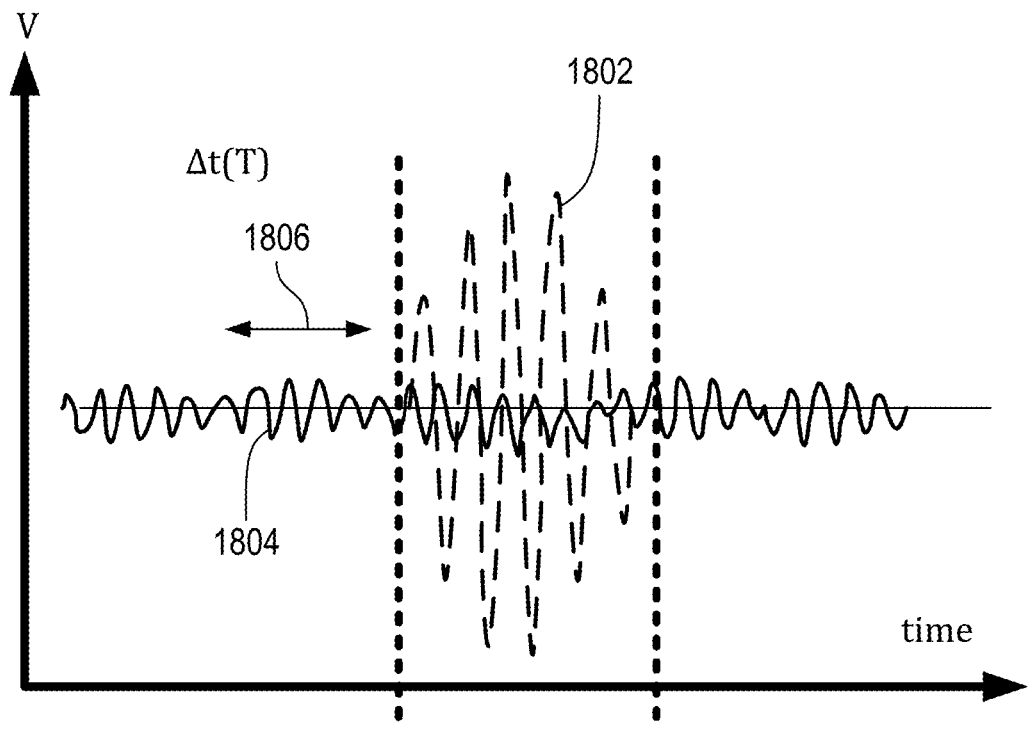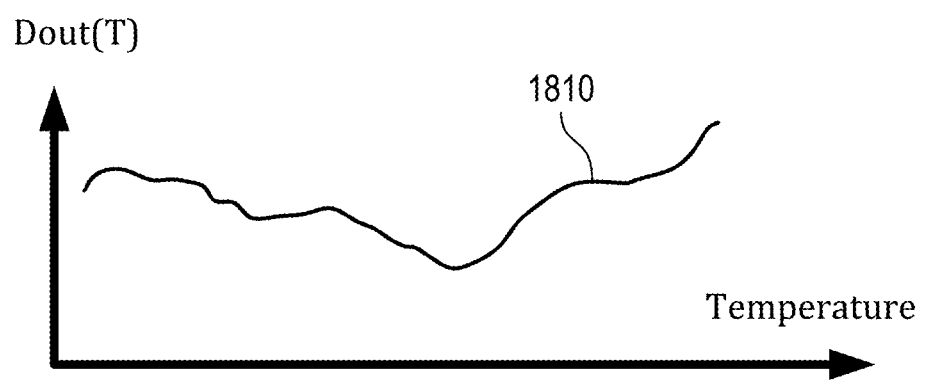
FIG. 18

ULTRASONIC TOUCH AND FORCE INPUT DETECTION

CROSS-REFERENCES TO RELATED APPLICATIONS

The present application claims the benefit of U.S. Patent Application No. 62/674,317 filed May 21, 2018 and entitled "ULTRASONIC TOUCH AND FORCE INPUT DETECTION" and U.S. Patent Application No. 62/725,697 filed Aug. 31, 2018 and entitled "ULTRASONIC TOUCH AND FORCE INPUT DETECTION," which are both hereby incorporated by reference in their entirety.

BACKGROUND

Capacitive, resistive and inductive sensing are used in industrial, automotive, medical, and consumer applications to detect touch inputs. The use of capacitive technology to detect a touch input has grown rapidly in human interface devices (HID), such as track-pads and touch-screens. Consumer and industrial applications are beginning to adopt touch-buttons and sliders using capacitive technology in devices such as mobile phones, TV controls, automotive dashboards, remote controls, or industrial controls. Capacitive sensing has proven to be much more appealing than mechanical switches and rotary encoders, both in terms of looks and reliability.

However, the use of capacitive, resistive, or inductive sensing limits creative industrial designs due to challenges in touch input layout and system stack up. Conflicting priorities between design and robustness further complicates the design. It is also to be noted that present input touch sensing methodologies cannot be implemented on metal surfaces. In addition, current sensing technologies has inherent properties that limit water-proof applications. Pressure sensing technologies using strain gauges have emerged as alternative sensing technologies for metal surface touch input. However, the measurement of deflection and strain is often unreliable, specifically in metals. Additional sensing layers (e.g., capacitive) are required to detect an x-y position of an input touch detected using a strain gauge. Increased complexity in touch input interface materials, the implications of complex interfaces on industrial designs, water-proofing, and cost have been key challenges limiting the use of touch-inputs in any environment and in with any material. There is a need for improved systems and methods of detecting touch inputs to human machine interfaces (HMI).

Embodiments of the invention address these and other problems, individually and collectively.

BRIEF SUMMARY

A touch input solution is provided for improving detection of touch inputs in HMIs. An ultrasound input device can detect the presence of an object on any surface with a sensor positioned on the reverse side of the surface material. The ultrasound input device enables creative designs without disruption of product skin or design material. Such an ultrasound input device can be implemented in various devices, e.g., input touch buttons, sliders, wheels, etc. The ultrasound input device can be deployed under surfaces comprising a variety of materials simplifying industrial designs and appearance. Furthermore, a grid of the ultrasound input device buttons can be implemented to create key pad, mouse pad, or touch input on any surface anywhere. An ultrasound input device allows touch input deployment of an HMI on surfaces comprising wood, leather, glass, plastic, metal (e.g., aluminum or steel), ceramic, plastic, a combination of one or more materials, etc.

A touch input device implemented using an ultrasound input device can detect a touch input associated with a specific material. For example, an ultrasound input device can distinguish between a touch input from a glove and a touch input from a finger (each having a different reflection/transmission of the ultrasound when touching the material) and thus be configured for only glove triggering. This type of input touch control is ideal for medical devices. A touch input button implemented using an ultrasound input device can be easily implemented on aluminum, glass, titanium, and ceramic surfaces, replacing mechanical smartphone buttons.

An ultrasound input device provides an improvement to the aesthetic features and reliability of touch input detection over capacitive and mechanical devices. A button can be implemented on a surface by defining the button area on a touch surface. An ultrasound input device can be embedded/placed behind the surface and thus limits environmental exposure including dust and moist. An ultrasound input device can increase flexibility of button programmability options. For example, a user can define the functionality of the button through a system controller. In some embodiments, the system controller can monitor user behaviors to improve machine/system preferences and performance. An ultrasound input device mechanically coupled to a surface but positioned away from view, such as underneath or behind an opaque surface, can be used to provide a hidden input not discernable or not easily discoverable to those who do not already know its location. An ultrasound input device can be low powered and battery powered, such as to operate for extended periods of time without requiring direct connection to a mains power source. An ultrasound input device can be or be incorporated into an internet of things (TOT) device capable of providing sensor data (e.g., a button press) to other devices on a local or remote network.

Multiple touch input detection (e.g., number of taps on the buttons or hold or swipe to different directions) can be used to increase the functionality of a single input device. In some embodiments, an ultrasound input device can also enable detection of specific objects as a source of a touch input. For example, an ultrasound input device can be configured to activate the button based on material characteristics of the object. Furthermore, an ultrasound input device allows for monitoring of the touch input. For example, a vehicle using one or more ultrasound input devices can monitor a hands-on steering wheel requirement when auto-pilot is disengaged.

The analog and digital circuits necessary to operate the ultrasonic touch input can be integrated with the ultrasound transducers. This integration allows for achieving very small chip height (e.g., less than 0.5 mm) and foot print (e.g., less than 1 $mm^2$) and enables input touch detection in tight spaces. In some embodiments, the output from the chip can be based on Inter-Integrated Circuit ($I^2C$). This on-chip processing can eliminate the need for separate analog chips for ultrasonic sensor signal amplification and analog to digital conversion. The ultrasonic touch input sensor can process and output a signal indicating a touch input independent from a main microcontroller or any other board component in the system in which the sensor is installed.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION

FIG. 18 is a set of charts depicting temperature dependence of reflected ultrasonic signals according to certain aspects of the present disclosure.

DETAILED DESCRIPTION

I. Device Overview

Embodiments of the invention are directed to an ultrasound input device to detect touch inputs. Specifically, embodiments are directed to an ultrasound input device comprising a transducer coupled to a material layer that provides a surface to receive touch input signals to a system. The ultrasound input device can be implemented using a variety of material layers including wood, leather, glass, plastic, metal (e.g., aluminum, steel, or others), stone, concrete, paper, polymers, biological materials (e.g., tissues, such as skin), a combination of one or more materials, etc. The flexibility of material selection enables the use of an ultrasound input device in a variety of applications including front and side buttons of a mobile device; a steering wheel, infotainment unit, center console controls, mirrors, seats, door handles, windows, etc. of a vehicle; internet-of-things devices; medical devices such as bed controls, blood pressure measurement devices; input detection for robotics such as touch sensing for robotic fingers; and hidden input devices such as hidden within furniture or behind walls.

A. Detecting a Touch Input Using Ultrasonic Signals

Figure 1:
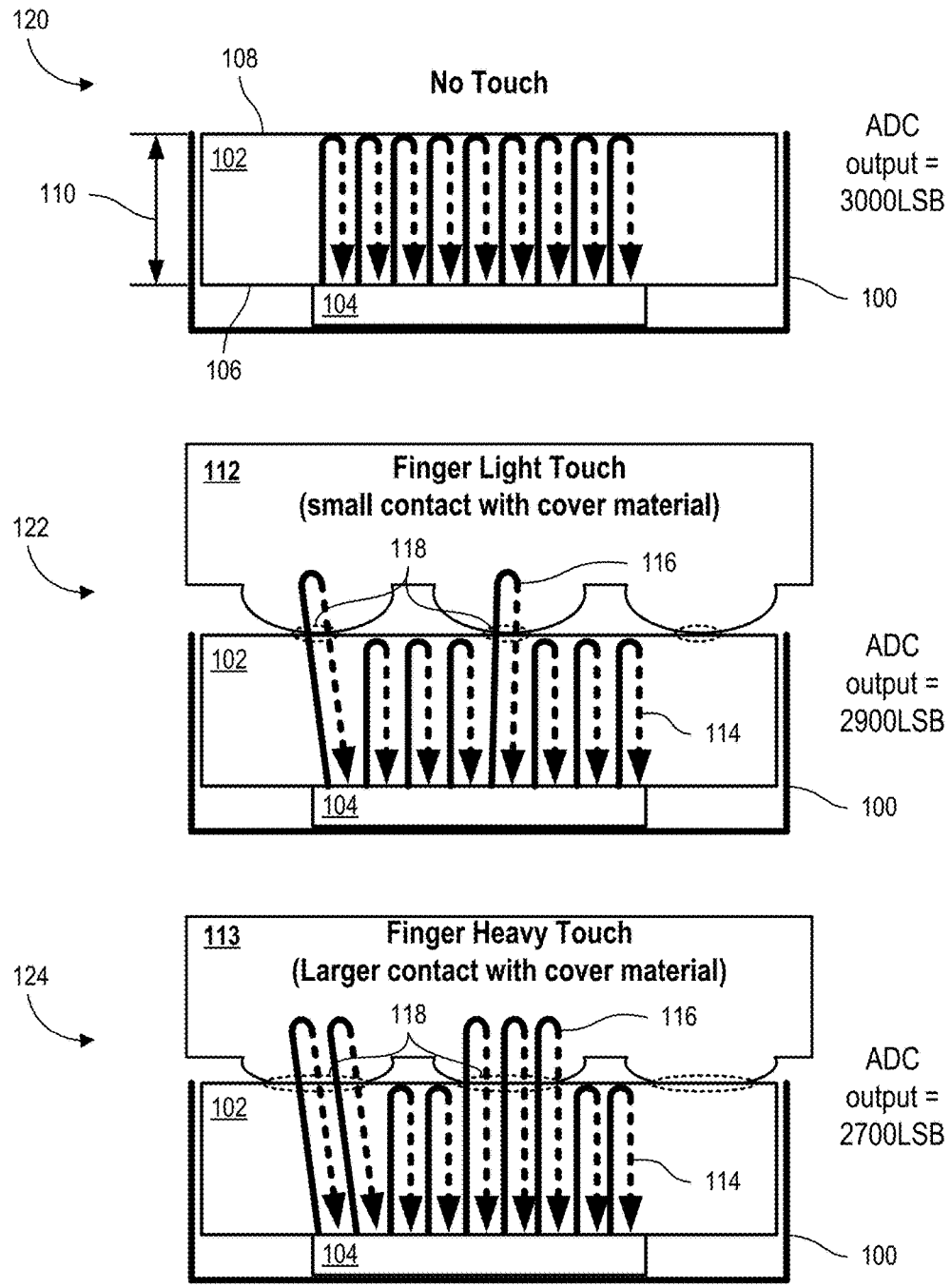
FIG. 1 is a schematic diagram depicting the effect of touch force on the reflected ultrasound signals in an ultrasound input system according to certain aspects of the present disclosure.

FIG. 1 is a schematic diagram depicting the effect of touch on the reflected ultrasound signals in an ultrasound input device according to certain aspects of the present disclosure. The ultrasound input device 100 (also referred to as a touch sensor) can include a transducer 104 coupled to a material layer 102. The material layer 102 has a first (interior) surface 106 and a second (exterior) surface 108. The material layer can be characterized by a distance 110 between the first surface 106 and the second surface 108. The material layer 102 can be a cover material of a larger device that integrates an ultrasound input device. In some embodiments, the material layer 102 can form a body or a portion of the body of a device. In these embodiments, the first surface 106 can form an interior surface of the body and the second surface 108 can form the exterior surface of the body. Second surface 108 can be considered exterior as it is exposed to the environment. First surface 106 can be considered interior in that it is not the surface that contact is to be detected or in that it is the surface where the transducer 104 is acoustically coupled to the material layer 102. FIG. 1 shows the ultrasound input device with no touch 120, the ultrasound input device with a light touch 122, and the ultrasound input device with a heavy touch 124.

This touch sensor is triggered based on material acoustic properties of touch surface (material layer 102) and the input object 112. Detection of the light touch 122 is dependent on extent of reflected ultrasonic signals 114 in the material layer 102 versus absorbed ultrasonic signals 116 transmitted through the second surface 108 of the material layer 102 into the input object 112. As used herein, a reflected ultrasonic signal (e.g., reflected ultrasonic signals 114) can refer to a signal that has reflected off the second surface 108 of the material layer 102, and an absorbed ultrasonic signal (e.g., absorbed ultrasonic signals 116) can refer to a signal of which at least a portion of the signal has been absorbed by an input object 112 (e.g., a finger) contacting the second surface 108 of the material layer 102. The contact (e.g., based on pressure) of the input object 112 on the touch surface defines one or more contact areas 118 and an amount of reflection. Thresholds can be set based on the contact area 118 of touch for triggering the button and impedance difference between input object 112 and material layer 102.

The size of the contact areas 118 and space between the contact areas 118 can be indicative of the size and spacing of the finger's ridges, as well as the size and spacing of the valleys of the finger's fingerprint. Certain changes in the size and/or spacing between contact areas 118 can be indicative of different fingers contacting the material layer 102. For example a young individual may have smaller valleys (e.g., a smaller distance between contact areas 118) than an older individual. In some cases, the detected size and/or spacing between contact areas 118 can be used to detect or make an inference as to the user contacting the material layer 102. Such an inference can be used to apply customizations (e.g., have a touch event result in different actions for different users or have different sensing thresholds for different users), test for permissions (e.g., allow an action only if a recognized user is initiating the touch event), or perform other rule-based actions using the inference.

The heavy touch 124 can be distinguished from the light touch 122 by determining that fewer reflected signals or fewer non-attenuated signal are received by the transducer 104 due to an increased number of absorbed ultrasonic signals 116. The ultrasound input device 100 and input object 112 will have a larger contact area 126 if the pressure of the touch is increased, e.g., as the contacting surface flattens. As shown in FIG. 1, the larger contact area 126 increases the number of absorbed ultrasonic signals 116 passing through the second surface 108 of the material layer 102 into the input object 112. In the case of a user's finger, the larger contact area 126 can be indicative of a ridge of the user's finger being flattened against the second surface 108 of the material layer 102. In some cases, with the input object 112 is not a finger or is a finger covered by another material, the larger contact area 126 can be a result of textured elements of the input object 112 being flattened against the second surface 108 of the material layer 102.

Figure 2:
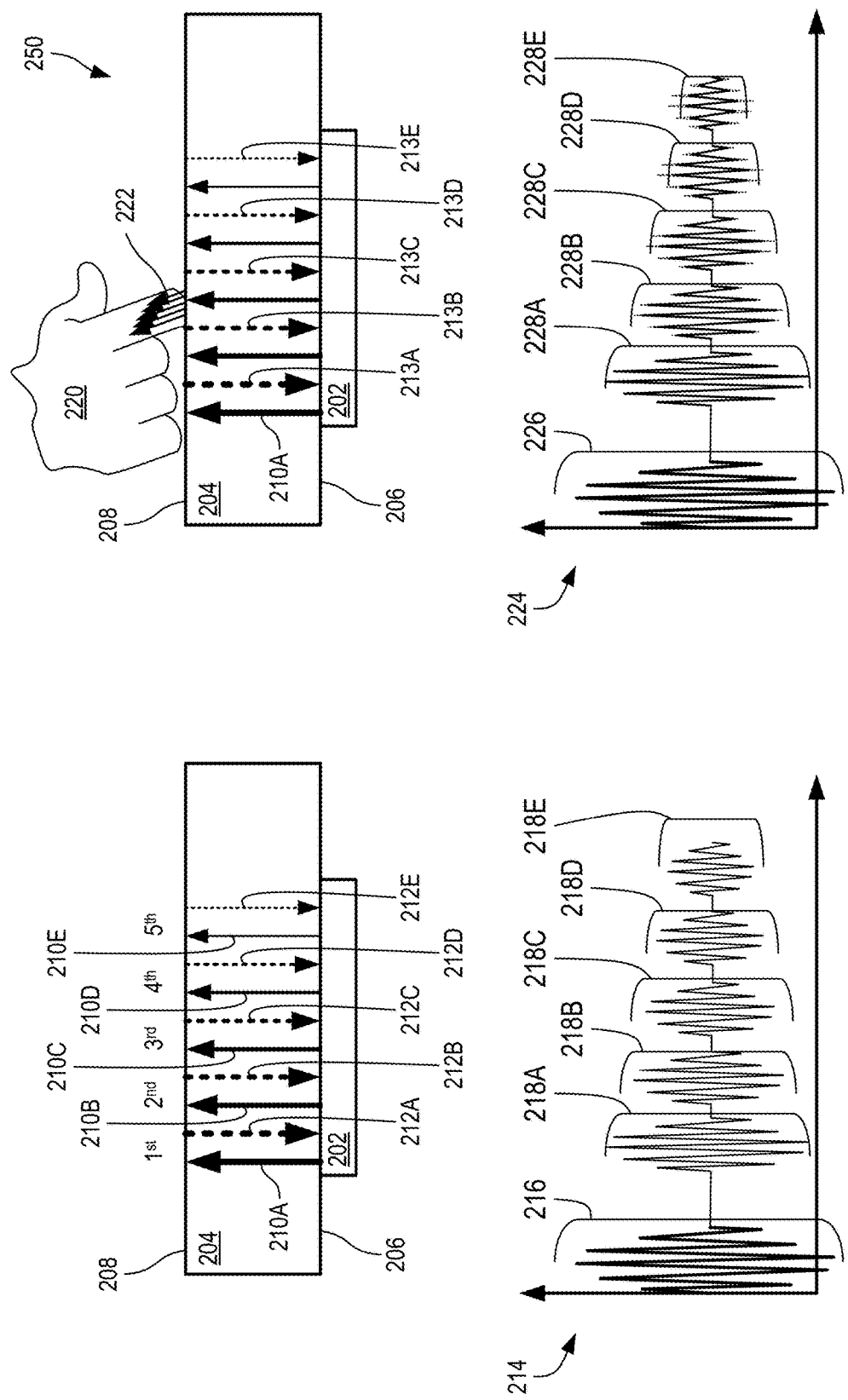
FIG. 2 is a schematic diagram depicting an ultrasound input system in an non-contacted state and a contacted state according to certain aspects of the present disclosure.

FIG. 2 is a schematic diagram depicting an ultrasound input system in a non-contacted state and a contacted state according to certain aspects of the present disclosure. FIG. 2 shows the ultrasound input device with no touch 200 (e.g., a non-contacted state) and with a touch 250 (e.g., a contacted state). The ultrasound input device includes a transducer 202 coupled to the material layer 204. In this embodiment, the material layer 204 is shown as aluminum, but can be any material (e.g., glass, wood, leather, plastic, etc.). The transducer 202 is coupled to a first (interior) surface 206 of the material layer 204. A second (exterior) surface 208 of the material layer 204 is in contact with the air.

For the ultrasound input device with no touch 200, the transducer 202 emits an ultrasonic signal 210A directed into the material layer 204 and toward the second surface 208. Air has an acoustic impedance of approximately zero and causes the second surface 208 to reflect a reflected ultrasonic signal 212A with close to 100% of the emitted ultrasonic signal (e.g., at or more than 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.81%, 99.82%, 99.83%, 99.84%, 99.85%, 99.86%, 99.87%, 99.88%, 99.89%, 99.9%, 99.91%, 99.92%, 99.93%, 99.94%, 99.95%, 99.96%, 99.97%, 99.98%, and/or 99.99%.). The reflected ultrasonic signal 212A can itself be reflected off the first surface 206 to generate a reflected-emission signal 210B, which can be reflected off the second surface 208 to result in a second reflected ultrasonic signal 212B. As depicted in FIG. 2, four reflected ultrasonic signals 212A, 212B, 212C, 212D generate four respective reflected-emission signals 210B, 210C, 210D, 210E. Any number of reflected ultrasonic signals 212A, 212B, 212C, 212D, 212E and reflected-emission signals 210B, 210C, 210D, 210E can result from an initial emitted ultrasonic signal 210A until the signals become too attenuated to be reflected and/or detected. Plot 214 shows a first amplitude 216 corresponding to the emitted ultrasonic signal 210A and a set of subsequent amplitudes 218A, 218B, 218C, 218D, 218E corresponding to the reflected ultrasonic signals 212A, 212B, 212C, 212D, 212E. The first subsequent amplitude 218A is smaller than the first amplitude 216 due to losses in the material layer 204. Each of the remaining subsequent amplitudes 218B, 218C, 218D, 218E is smaller than the amplitude of the previous subsequent amplitude 218A, 218B, 218C, 218D due to losses in the material layer 204.

In some cases, the frequency or frequencies selected for use with the ultrasound input device can be selected to achieve a small or minimal attenuation in a non-contacted state, thus achieving a large or maximum number of reflected ultrasonic signals. In some cases, the set of reflected ultrasonic signals 212A, 212B, 212C, 212D, 212E stemming from a single emitted ultrasonic signal 210A can be referred to as a train of reflected signals. For illustrative purposes, the various reflected ultrasonic signals 212A, 212B, 212C, 212D, 212E and reflected-emission signals 210B, 210C, 210D, 210E are depicted spaced apart from left to right in FIG. 2, however it will be understood that these signals are temporally separated and may not necessarily be spatially separated.

For the ultrasound input device with a touch 250, an input object 220, in this case a finger, is in contact with the second surface 208 of the material layer 204. Reflection loss depends on how much the touch input medium versus the input object differ in terms of acoustic impedance. For example, reflection loss (dB) can be represented as 20 log 1 (−Z2−Z1/Z2+Z1), where Z1 is the impedance of the material layer 204 and Z2 is the impedance of the input object 220. Once an input object 220 is in contact with material layer 204, the emitted ultrasonic signal 210A is divided into two parts. One part, the echo, consists of a reflected ultrasonic signal 213A and is reflected back towards the transducer. A second part 222 penetrates into the input object 220. The reflected ultrasonic signal 213A can itself be reflected off the first surface 206 to generate a reflected-emission signal. The reflected-emission signal can itself be divided into two parts, one of which is a second reflected ultrasonic signal 212B and another of which is the second part 222 that penetrates into the input object 220. As depicted in FIG. 2, four reflected ultrasonic signals 213A, 213B, 213C, 213D generate four respective reflected-emission signals. Any number of reflected ultrasonic signals 212A, 212B, 212C, 212D, 212E and reflected-emission signals can result from an initial emitted ultrasonic signal 210A until the signals become too attenuated to be reflected and/or detected.

As shown by plot 224, a first amplitude 226 corresponds to the emitted ultrasonic signal 210A. The first subsequent amplitude 228A corresponding to reflected ultrasonic signal 213A is reduced compared to the no touch ultrasound input device due to the second part 222 penetrating the input object 220. Each of the remaining subsequent amplitudes 228B, 228C, 228D, 228E is smaller than the amplitude of the previous subsequent amplitude 228A, 228B, 228C, 228D due to losses in the material layer 204. For illustrative purposes, plot 224 depicts the subsequent amplitudes 228A, 228B, 228C, 228D, 228E in solid line overlaid with the corresponding subsequent amplitudes 218A, 218B, 218C, 218D, 218E in dotted lines. The amount of overall attenuation of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state. Additionally, the amount of attenuation between each of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state.

Of note, the subsequent amplitudes 228A, 228B, 228C, 228D, 228E from plot 224 that are associated with a touch event attenuate faster than the corresponding subsequent amplitudes 218A, 218B, 218C, 218D, 218E from plot 214 that are associated with no touch event. In other words, the contrast between subsequent amplitudes of a touch event and subsequent amplitudes of a no touch event is greater with each subsequent reflection number n. In some cases, the ratio of a the n-th subsequent amplitude associated with no touch event to the n-th subsequent amplitude associated with a touch event can be $\Gamma^n:(1-\Gamma^n)$ where $\Gamma$ is the percentage of the signal reflected back from the second surface 208. For example, the ratio of subsequent amplitude 218A to subsequent amplitude 228A may be 100:90; the ratio of subsequent amplitude 218B to subsequent amplitude 228B may be 100:81; the ratio of subsequent amplitude 218C to subsequent amplitude 228C may be 100:72; the ratio of subsequent amplitude 218D to subsequent amplitude 228D may be 100:63; and the ratio of subsequent amplitude 218E to subsequent amplitude 228E may be 100:54.

B. Ultrasound Touch Input Device

Figure 3:
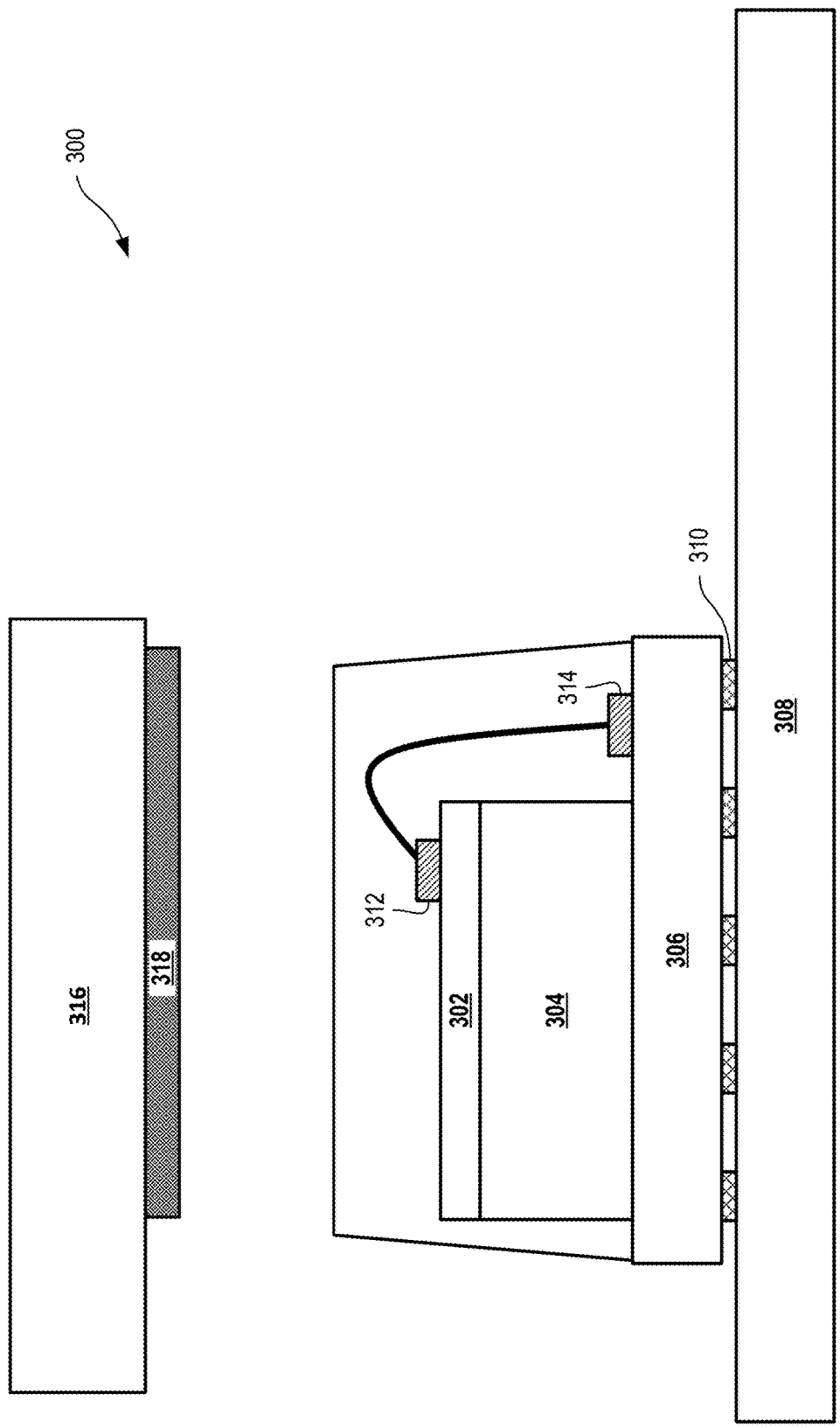
FIG. 3 is a schematic diagram depicting an ultrasound input device according to certain aspects of the present disclosure.

FIG. 3 shows an ultrasound input device according to certain aspects of the present disclosure. Ultrasound input device 300 can be attached to any surface to detect touch inputs. The ultrasound input device 300 can include a sensor 302, such as a piezoelectric micromachined ultrasonic transducer (PMUT). A PMUT transducer is a piezoelectric ultrasonic transducer that comprises a thin membrane coupled to a thin piezoelectric film to induce and/or sense ultrasonic signals. The sensor 302 can be integrated on an application-specific integrated circuit (ASIC), such as CMOS (complementary metal-oxide-semiconductor) ASIC 304 (all-in-one) and formed on a base 306. The ASIC 304 can include electrical circuits and/or modules usable to perform various processes as disclosed herein, such as various analog and/or digital processing as described with reference to FIGS. 5-20. For example, ASIC 304 can be used to drive sensor 302, detect reflected ultrasonic signals using sensor 302, and determine amplitudes associated with the reflected ultrasonic signals (e.g., using various analog technologies such as accumulation and integration). In some cases, ASIC 304 can optionally determine a threshold value to which the determined amplitudes can be compared to make a determination about whether or not a touch event has occurred, in which case the ASIC 304 can output a signal associated with the occurrence of the touch event.

In some cases, circuitry of the ASIC 304 can perform certain process in analog, such as signal rectification, integration, mixing, modification, accumulation, and the like. As used herein, analog circuitry can include any circuitry capable of performing an action (e.g., rectification, integration, and the like) on an analog signal without first digitizing the analog signal. In an example, ASIC 304 can include analog circuitry capable of taking a received ultrasonic signal, rectifying the signal, and integrating at least a portion of the rectified signal to provide an integrated signal, such as described with reference to FIG. 6. In another example, ASIC 304 can include analog circuitry capable of taking a received ultrasonic signal, calculating absolute values of the signal, and accumulating the absolute values to provide an accumulated signal, such as described with reference to FIG. 8. In another example, ASIC 304 can include analog circuitry capable of taking a received ultrasonic signal, squaring the signal through self-mixing, and integrating the squared signal to provide an integrated signal, such as described with reference to FIG. 9.

In some cases, a different style of ultrasonic transducer can be used for sensor 302 instead of a PMUT sensor. In some cases, the ultrasonic sensor can be formed using a deposited layer of piezoelectric material (e.g., aluminum nitride, lead zirconate titanate (PZT), or polyvinylidene fluoride (PVDF)). In some cases, the ultrasonic sensor can be a capacitive micromachined ultrasonic transducer (CMUT). In some cases, the ultrasonic sensor can be a resonator array of piezoelectric devices (e.g., piezoelectric cantilevers or piezoelectric pillars).

The base 306 can be bonded 310 to a flexible printed circuit/printed circuit board 308 (FPC/PCB) of a larger integrated device such as a mobile phone. In some embodiments, a contact area 312 on the sensor 302 can be bonded to a base contact 314. As shown, the dimensions ultrasound input device 300 can be equal to or less than 1.5 mm×1.5 mm×0.5 mm in size, although other sizes can be used. In some cases, the FPC/PCB 308 to which the base 306 is attached can receive information associated with the amplitude of detected reflected ultrasonic signals and perform some of the functionality disclosed herein, such as determining threshold values and/or determining when a touch event has occurred. However, in some cases, the FPC/PCB 308 simply receives a signal associated with occurrence of a touch event, and thus does not need to perform further analysis of amplitudes of detected reflected ultrasonic signals to perform actions based on a touch event.

The ASIC 304 and sensor 302 integration enables small form factor that leads placement of buttons or other functionality in many space-limited applications. For example, smartphone side mechanical buttons can easily be replaced with the ultrasound input device 300 under casing. To implement a touch interface of a system or other suitable functionality, the ultrasound input device 300 can be bonded to a surface 316 using an adhesive 318.

Figure 4:
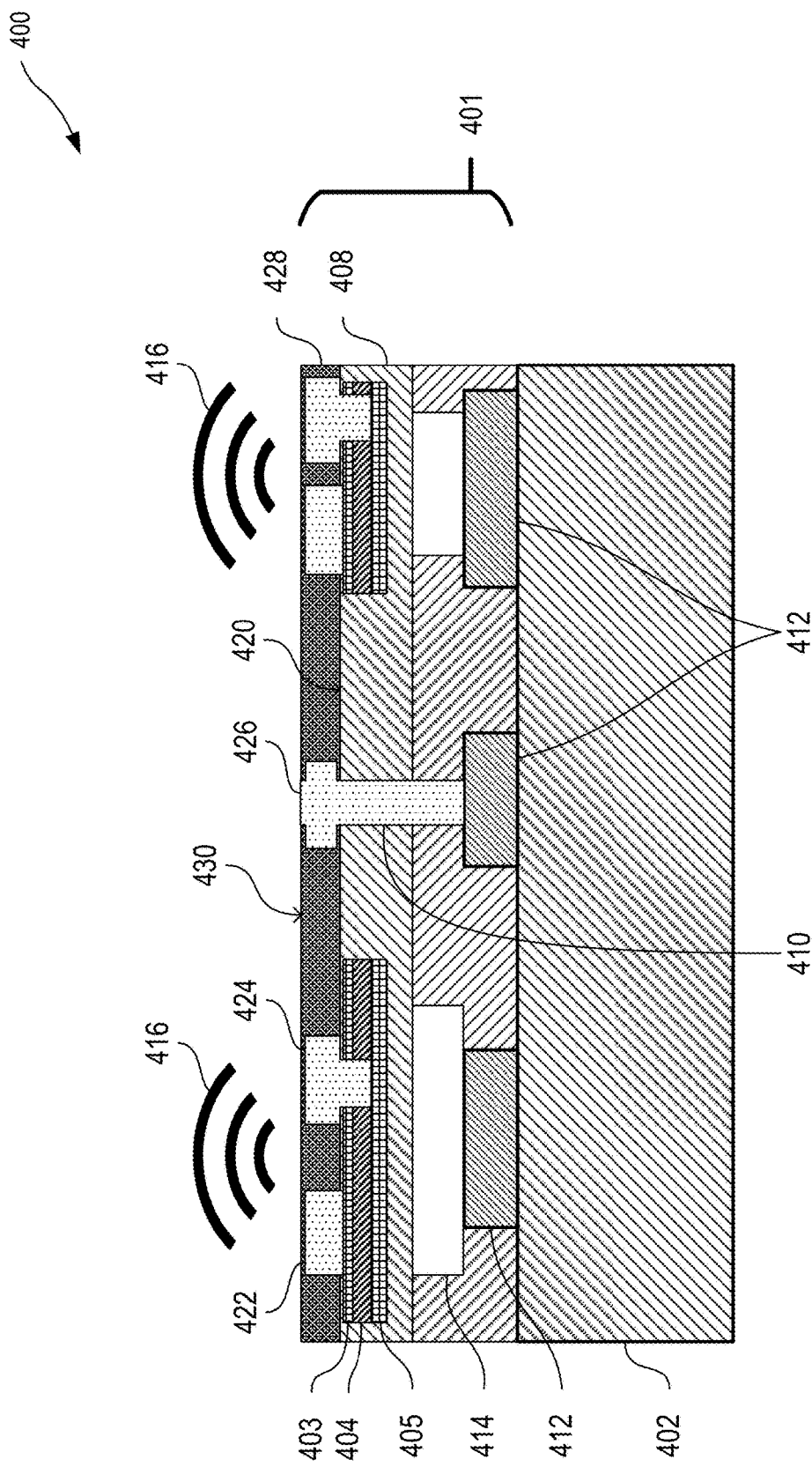
FIG. 4 is a cross-sectional view of two piezoelectric micromachined ultrasonic transducers bonded to a CMOS wafer according to certain aspects of the present disclosure.

FIG. 4 is a cross-sectional view of two piezoelectric micromachined ultrasonic transducers integrated to a CMOS wafer according to certain aspects of the present disclosure. Device 400 shows a cross-sectional view of two PMUTs bonded to a CMOS wafer 402 that can be used in an ultrasound input device. Each PMUT may be formed on a MEMS wafer 401 that is bonded to a CMOS wafer 402. In this way, PMUTs may be coupled to the requisite processing electronics of the CMOS wafer 402. It will be understood that each PMUT may have an active piezoelectric layer 404 along with a first electrode 403 and a second electrode 405. The first electrode 403 and the second electrode 405 can be electrically coupled to the piezoelectric layer 404.

In some embodiments, the PMUTs may include a first contact 422 electrically coupled to the first electrode 403, a second contact 424 electrically coupled to the second electrode 405, and a third electrode 426 electrically coupled to the CMOS wafer 402. Applying alternating voltage through the first electrode 403 and the second electrode 405 can cause movement (e.g., flexural motion) of the piezoelectric layer 404, which can result in generated sound waves. Likewise, received sound waves that induce movement in the piezoelectric layer 404 can be sensed as changing voltages across the first electrode 403 and second electrode 405. One or more vias 410 may be formed to in the PMUTs. Each of the contacts may be wire bonded to an electronics board. In some embodiments, PMUTs may include a passivation layer 428 formed on a surface 420 and the contacts. The surface 420 or an adhesive coupling surface 430 on the surface of the passivation layer 428 may be coupled to a material layer of an ultrasound input device.

In some embodiments, the passive electrical layer 408 may comprise $SiO_2$ or any other suitable passive layer. The active piezoelectric layer 404 may be approximately 1 μm thick Aluminum Nitride, and the passive elastic layer may be approximately 1 μm thick single-crystal Silicon, although other sizes and materials may be used. In some embodiments, the active piezoelectric layer 404 may be Scandium-doped Aluminum Nitride. Alternatively, the active piezoelectric layer 404 may be another suitable piezoelectric ceramic such as PZT. Both the top and bottom electrodes 406 may comprise Molybdenum. In order to bond the PMUTs to the top metal 412 of CMOS wafer 402, fusion bonding via thru-silicon-via (TSV) as shown at 410 may be used. This methodology results in significant parasitic reduction which in turn results in improved signal integrity and lower power consumption.

In some embodiments, cavity 414 may be formed with a vacuum or near vacuum to isolate the transducer from the processing electronics in the CMOS wafer 402. The sound generated by the PMUTs will not travel through the near vacuum of cavity 414 minimizing reflection and interference that may be caused by material interfaces with the CMOS wafer 402. The cavity 414 may cause ultrasound 416 to travel away from the PMUTs. Ultrasound 416 may travel through the adhesive coupling interface 430 and into the material layer of the ultrasound input device. The material layer may reflect ultrasound 416 causing a return echo to reflect back to the PMUTs. The return echo travels through the adhesive coupling interface and is received by the PMUTs.

In some embodiments, the CMOS wafer 402 may be an application specific integrated circuit (ASIC) that includes one or more devices necessary to drive the transducer. The drive voltage for an array of PMUTs may be less than 4 volts. In some cases, the drive voltage may be less than 1.8 volts. In some cases, the drive voltage may be at or less than 4, 3.5, 3, 2.5, 2, 1.9, 1.8, 1.7, 1.6, or 1.5 volts. The ASIC can be manufactured to meet size requirements associated with the size of an associated PMUT. In some embodiments, the ASIC may include one or more modules to receive measured signals. The ASIC may be configured to further process the signal. For example, the ASIC may include one or more rectifiers to generate an absolute value signal by taking the absolute value of the received signals, which may be an alternating current. The ASIC may also include an integrator and analog to digital converters (ADCs) to convert the reflected ultrasonic signal to a digital representation of the reflected signal. The integration of ASIC and PMUTs further allows for embedding gain amplifiers and ADC in an ASIC and eliminating the standalone ADC-sensor controller chip. This opens up space on associated circuit boards and reduces touch input sensor implementation cost. In some embodiments, the ASIC may transmit the digital signal to at least one or more of a memory, a processor, and a remote device. In other embodiments, the ASIC may include one or more signal processing modules.

The PMUT arrays can be compatible with CMOS semiconductor processes. In some embodiments, PMUT materials and dimensions can be compliant with Semiconductor Equipment and Materials International (SEMI) standard specifications. Because PMUTs can be compliant with SEMI specifications, the transducer arrays can be used with existing CMOS semiconductor fabrication tools and methods. For example, photolithography may be used to form one or more PMUTs. In contrast, current piezoelectric ultrasound transducer arrays are formed using a die saw that cannot match the precision of photolithography. As a result, PMUTs can be smaller, operate at lower voltages, and have lower parasitics.

II. Ultrasound Signal Processing

Reflected ultrasonic signals can be processed to produce images and determine a range to an object. Embodiments described herein can process reflected ultrasonic signals to determine if an object is in contact with a surface.

A. Detecting Touch Input by Digitizing Reflected Signal

Figure 5:
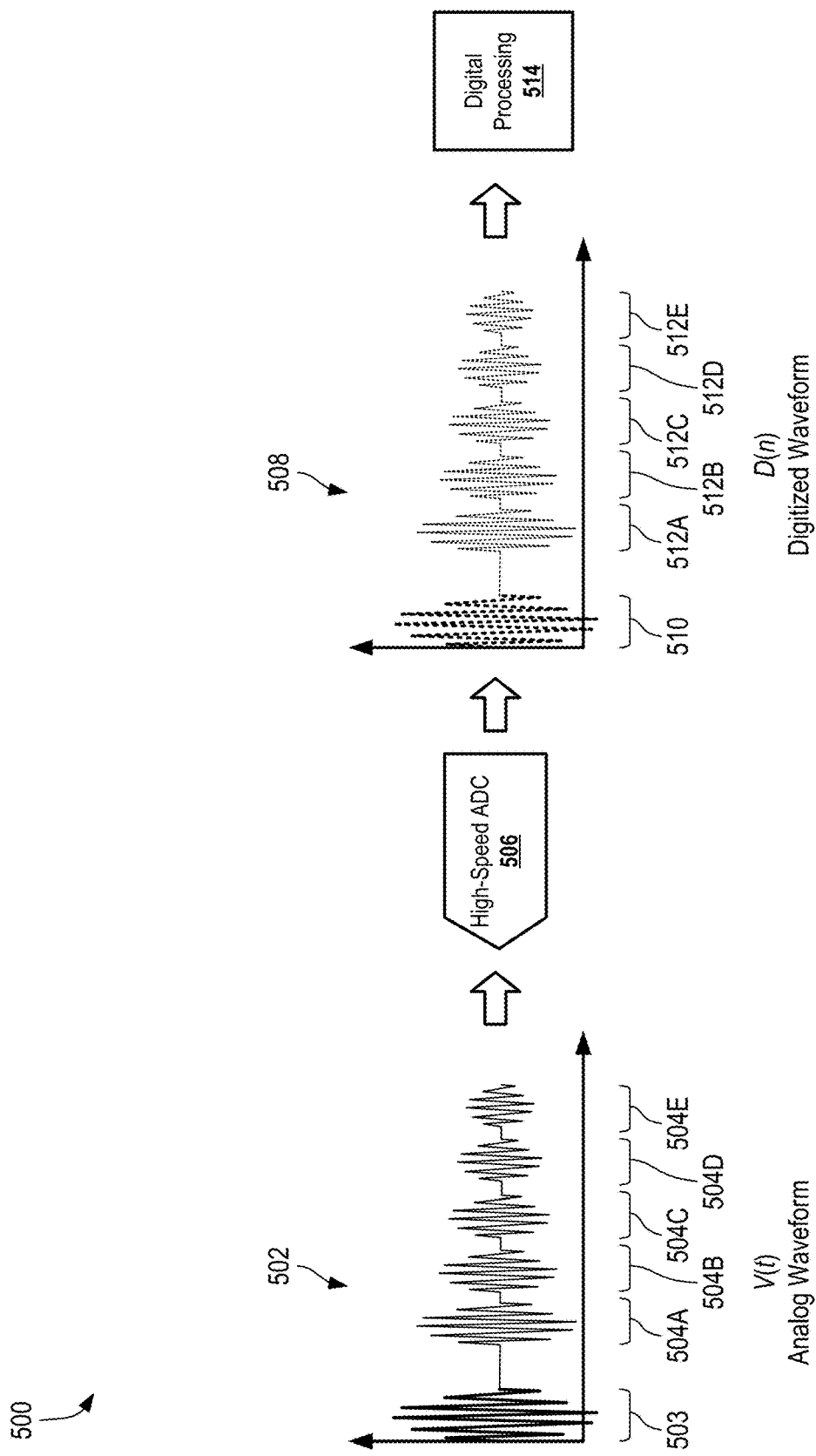
FIG. 5 is a schematic diagram of a flow for digitally processing ultrasound signals emitted and received by an ultrasound input device according to certain aspects of the present disclosure.

FIG. 5 is a schematic diagram of a flow 500 for processing ultrasound signals emitted and received by an ultrasound input device according to certain aspects of the present disclosure. The flow 500 includes emitting and receiving an ultrasonic signal as illustrated in a first plot 502. The first plot 502 shows an analog measurement of a first signal 503 for an emitted ultrasonic signal and a set of subsequent signals 504A, 504B, 504C, 504D, 504E for a set of reflected ultrasonic signals associated with an ultrasound input device. The first signal 503 and the subsequent signals 504 can be measured using a high-speed ADC 506 to digitize the signal.

The output of the high-speed ADC 506 is shown in a second plot 508. The second plot 508 includes a first digital representation 510 of the emitted ultrasonic signal and a subsequent digital representations 512A, 512B, 512C, 512D, 512E of the reflected ultrasonic signals associated with the ultrasound input device. The first digital representation 510 and the subsequent digital representations 512A, 512B, 512C, 512D, 512E can be processed by a digital processing module in 514 embedded in the ultrasound input device and/or a system coupled to the ultrasound input device. The digital processing module 514 can demodulate the digital representations of the data to extract touch input information. For example, the digital processing module can process one or more of the subsequent digital representations 512A, 512B, 512C, 512D, 512E to determine that an amplitude of the second digital representation is below a threshold value that is associated with an object being in contact with the surface of the ultrasound input device.

B. Detecting Touch Input Using Energy Integration

Figure 6:
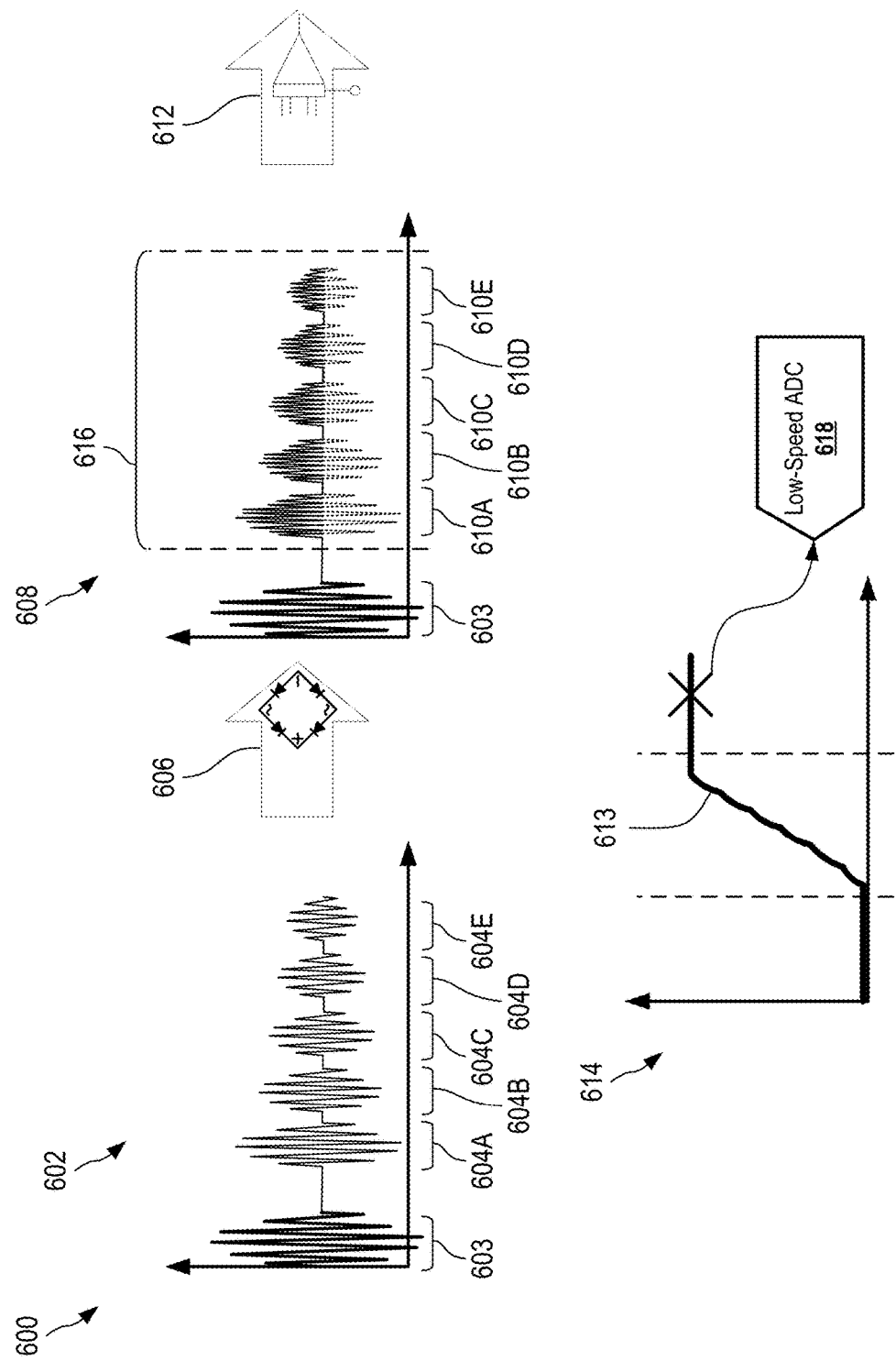
FIG. 6 is a schematic diagram of a flow for processing ultrasound signals emitted and received by an ultrasound input device using energy integration according to certain aspects of the present disclosure.

FIG. 6 is a schematic diagram of a flow 600 for processing ultrasound signals emitted and received by an ultrasound input device using energy integration according to certain aspects of the present disclosure. The flow 600 includes emitting and receiving an ultrasonic signal as illustrated in a first plot 602. The first plot 602 shows an analog measurement of a first signal 603 for an emitted ultrasonic signal and a set of subsequent signals 604A, 604B, 604C, 604D, 604E for a set of reflected ultrasonic signals associated with an ultrasound input device. The flow 600 can include an ultrasound input device with an analog circuit including a rectifier 606 to rectify the subsequent signals 604A, 604B, 604C, 604D, 604E.

A second plot 608 shows the first signal 603 and a set of rectified signals 610A, 610B, 610C, 610D, 610E each corresponding to respective ones of the set of reflected ultrasonic signals. The rectified signals 610A, 610B, 610C, 610D, 610E can be processed by an analog integrator 612 to output a direct current (DC) signal 613, shown in a third plot 614, which is directly proportional to an amplitude of the reflected ultrasonic signal. The DC signal 613 can be determined using an energy measurement window 616. The DC signal 613 can represent an energy value associated with the energy of the received signal measured during the energy measurement window 616. The DC signal 613 can be processed by a low-speed ADC 618. The DC signal 613 output by the rectifier 606 and the integrator 612 remove the need to generate a high frequency digital output and, as a result, the low-speed ADC can use less power and can be fabricated on a smaller chip area.

Figure 7:
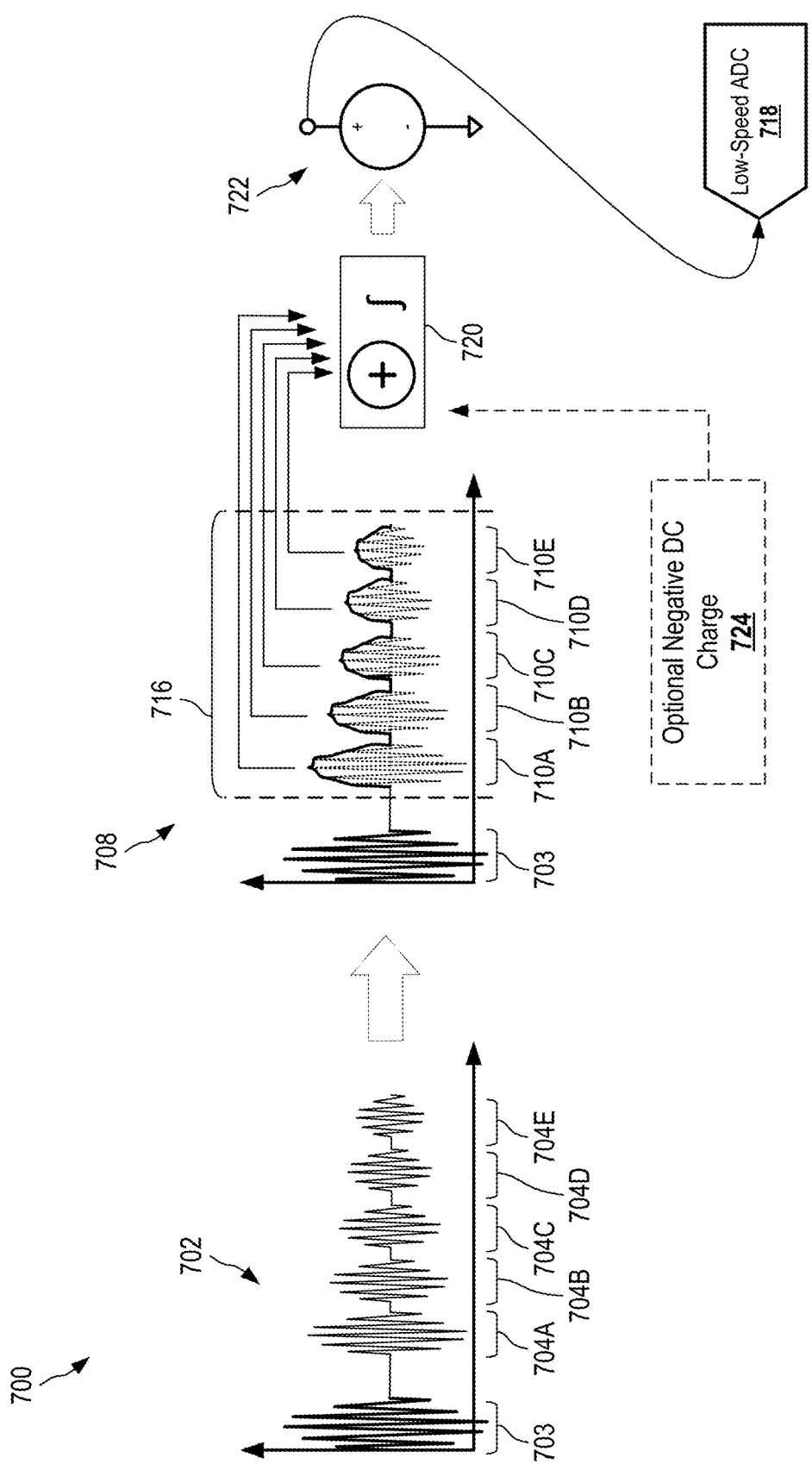
FIG. 7 is a schematic diagram of an example of a flow for processing ultrasound signals emitted and received by an ultrasound input device using energy integration according to certain aspects of the present disclosure.

FIG. 7 is a schematic diagram of an example of a flow 700 for processing ultrasound signals emitted and received by an ultrasound input device using energy integration according to certain aspects of the present disclosure. The flow 700 includes emitting and receiving an ultrasonic signal as illustrated in a first plot 702. The first plot 702 shows an analog measurement of a first signal 703 for an emitted ultrasonic signal and a set of subsequent signals 704A, 704B, 704C, 704D, 704E for a set of reflected ultrasonic signals associated with an ultrasound input device. The flow 700 can include an ultrasound input device with an analog summation or integration circuit 720 and a summed voltage output 722.

A second plot 708 shows the first signal 703 and a set of energy signals 710A, 710B, 710C, 710D, 710E each corresponding to the energy of respective ones of the set of reflected ultrasonic signals. For illustrative purposes, the set of energy signals 710A, 710B, 710C, 710D, 710E is depicted in solid line overlaid with the set of subsequent signals 704A, 704B, 704C, 704D, 704E from plot 702 shown in dotted line.

A summation or integration circuit 720 can received the set of energy signals 710A, 710B, 710C, 710D, 710E from within an energy measurement window 716. The summation or integration circuit 720 can generate a voltage output 722 that is an analog value representing the summed/integrated energy within the energy measurement window 716.

In some cases, an optional negative DC charge circuit 724 can be applied to the summation or integration circuit 720 to offset information not associated with a touch event. Since touch events are identified based on differences between received signals during a non-contacting state and received signals during a contacting state, there is some amount of information within the set of subsequent signals 704A, 704B, 704C, 704D, 704E that is not associated with those differences (e.g., a baseline signal). Removing such baseline signals can result in more effective range to sample during analog-to-digital conversion. Since removing such a baseline signal in analog in the set of subsequent signals 704A, 704B, 704C, 704D, 704E would require precise phase alignment, it can be difficult to apply such corrections. However, as depicted in FIG. 7, and optional negative DC charge circuit 724 applied to the summation or integration circuit 720 can offset a particular amount of energy associated with the baseline signal or a portion thereof, thus improving the amount of effective range available for analog-to-digital conversion. In such cases, the voltage output 722 can be proportional to the energy of the signal minus the energy of the negative DC charge circuit 724.

The voltage output 722 can be processed by a low-speed ADC 718. The voltage output 722 of the summed/integrated energy within the energy measurement window 716 can remove the need to generate a high frequency digital output and, as a result, the low-speed ADC can use less power and can be fabricated on a smaller chip area.

Figure 8:
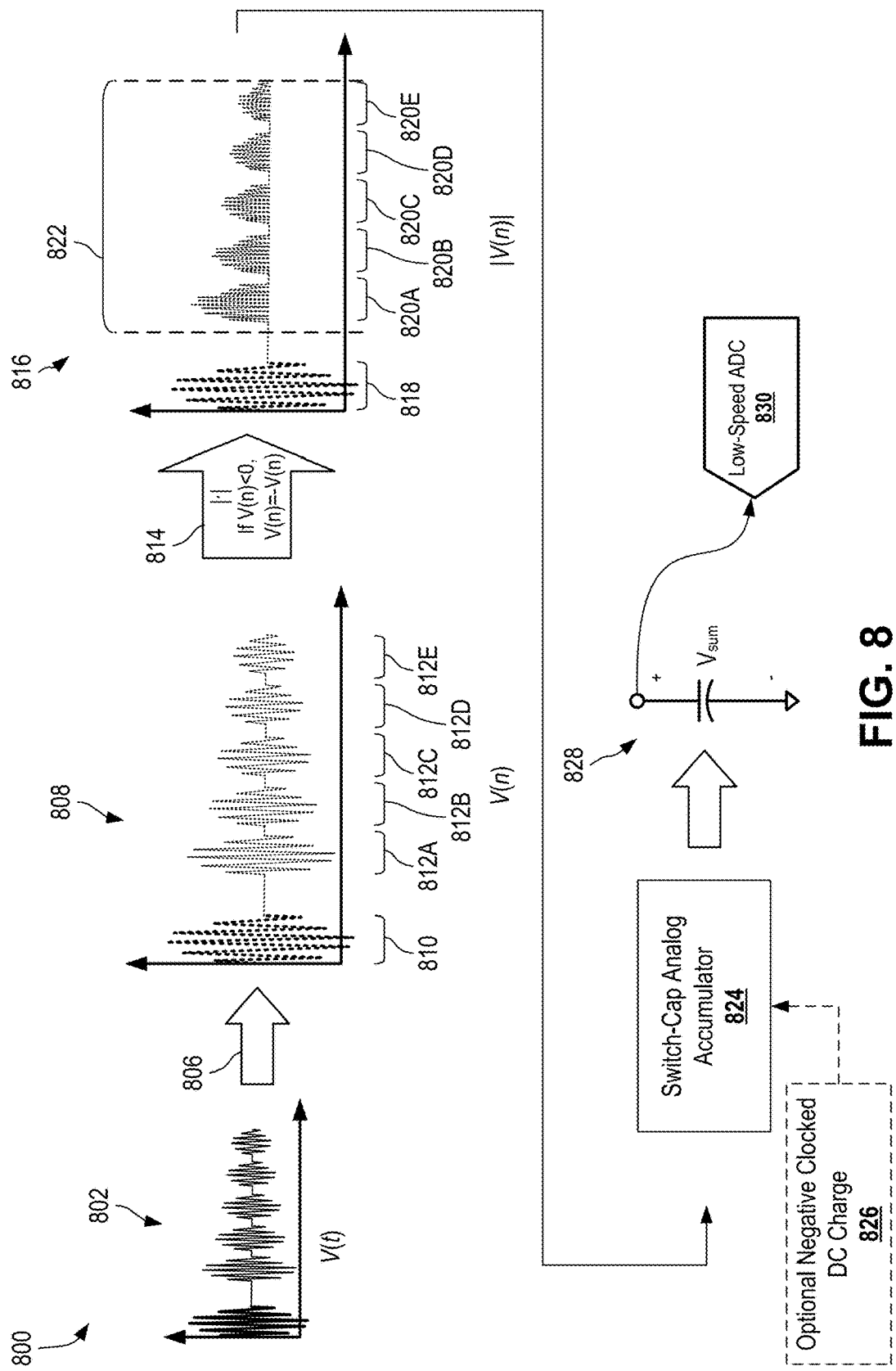
FIG. 8 is a schematic diagram of a flow for processing ultrasound signals emitted and received by an ultrasound input device using energy integration via absolute value accumulation according to certain aspects of the present disclosure.

FIG. 8 is a schematic diagram of a flow 800 for processing ultrasound signals emitted and received by an ultrasound input device using energy integration via absolute value accumulation according to certain aspects of the present disclosure. Flow 800 can be one technique for implementing flow 700 of FIG. 7. The flow 800 includes emitting and receiving an ultrasonic signal as illustrated in a first plot 802. The first plot 802 shows an analog measurement of a first signal for an emitted ultrasonic signal and a set of subsequent signals for a set of reflected ultrasonic signals associated with an ultrasound input device. The first plot 802 can depict voltage as a function of time (e.g., V(t)). The first plot 802 can be first plot 702 of FIG. 7. The flow 800 can include an ultrasound input device with an analog sampling circuit 806, and absolute value circuit 814, an analog accumulator 824, and a summed voltage output 828.

The set of subsequent signals from plot 802 can be passed through an analog sampling circuit 806 to result in a sampled first signal 810 and a set of sampled subsequent signals 812A, 812B, 812C, 812D, 812E as depicted in second plot 808. The second plot 808 can depict voltage as a function of sample (e.g., V(n) where n is the sample number). The sampled subsequent signals 812A, 812B, 812C, 812D, 812E can be passed to an absolute value circuit 814 that can generate a set of energy signals 820A, 820B, 820C, 820D, 820E as depicted in third plot 816. The third plot 816 can depict an absolute value of voltage as a function of sample (e.g., |V(n)|). The absolute value circuit 814 can pass all zero or positive values of the set of sampled subsequent signals 812A, 812B, 812C, 812D, 812E and reverse the polarity of all negative values.

A switch-capacitor analog accumulator 824 can be used to sum the set of energy signals 820A, 820B, 820C, 820D, 820E from within the energy measurement window 822. The switch-capacitor analog accumulator can generate a voltage output 828 that is an analog value representing the sum of the energy within the energy measurement window 822. In some cases, an analog integrator can be used instead of an accumulator.

In some cases, an optional negative clocked DC charge circuit 826 can be applied to the switch-capacitor analog accumulator 824 to offset information not associated with a touch event. Since the sampling circuit 806 is clocked according to a sample rate, the optional negative clocked DC charge circuit 826 can be clocked at the same rate to ensure the biasing voltage is applied at the appropriate intervals corresponding to the samples of the sampled subsequent signals 812A, 812B, 812C, 812D, 812E. When an optional negative clocked DC charge circuit 826 is used, the voltage output 828 can be proportional to the energy of the signal minus the energy of the negative clocked DC charge circuit 826.

The voltage output 828 can be processed by a low-speed ADC 830. The voltage output 828 of the summed energy within the energy measurement window 822 can remove the need to generate a high frequency digital output and, as a result, the low-speed ADC can use less power and can be fabricated on a smaller chip area.

Figure 9:
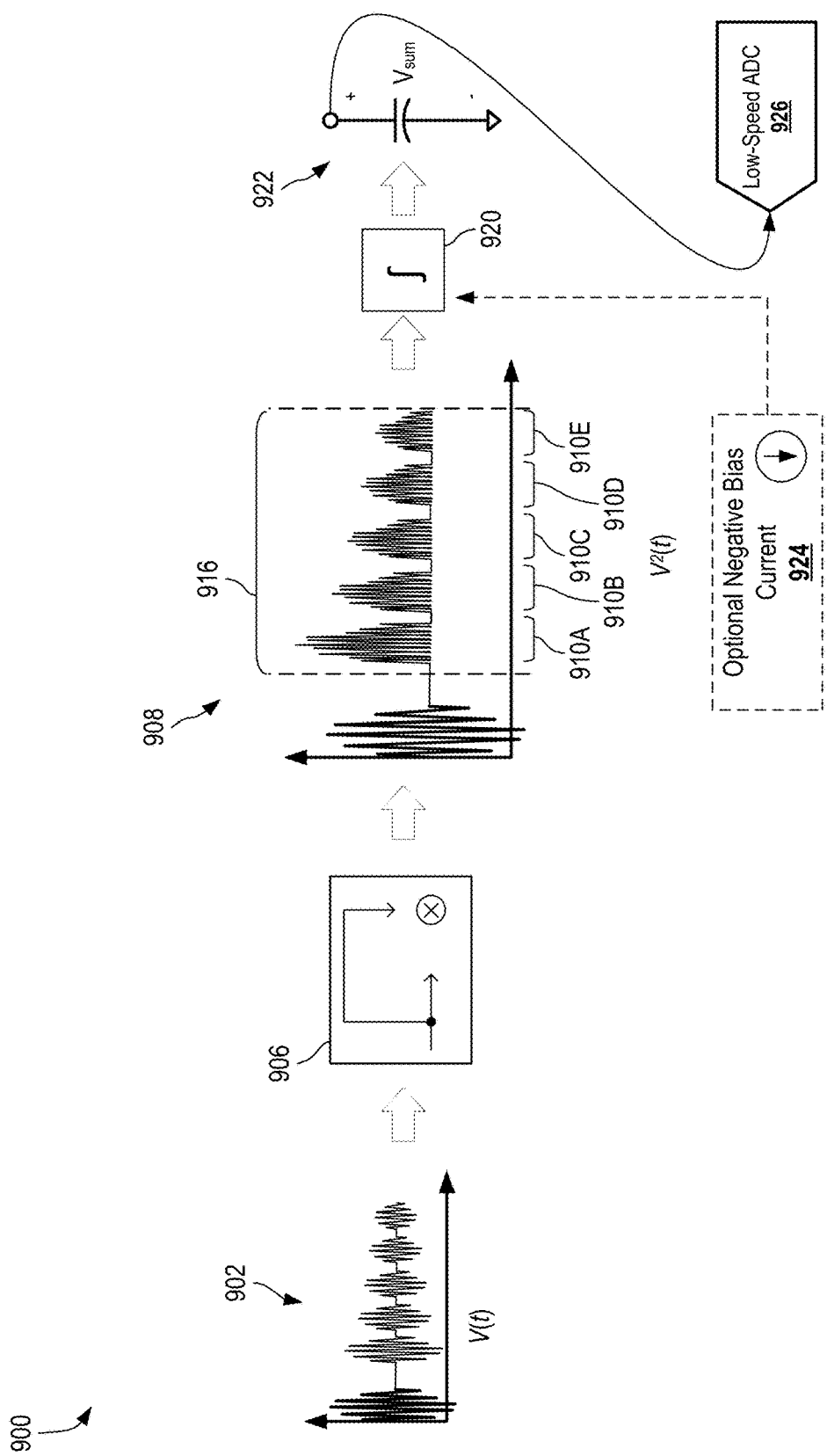
FIG. 9 is a schematic diagram of a flow for processing ultrasound signals emitted and received by an ultrasound input device using energy integration via self-mixing and integration according to certain aspects of the present disclosure.

FIG. 9 is a schematic diagram of a flow 900 for processing ultrasound signals emitted and received by an ultrasound input device using energy integration via self-mixing and integration according to certain aspects of the present disclosure. Flow 900 can be one technique for implementing flow 700 of FIG. 7. The flow 900 includes emitting and receiving an ultrasonic signal as illustrated in a first plot 902. The first plot 902 shows an analog measurement of a first signal for an emitted ultrasonic signal and a set of subsequent signals for a set of reflected ultrasonic signals associated with an ultrasound input device. The first plot 802 can depict voltage as a function of time (e.g., V(t)). The first plot 902 can be first plot 702 of FIG. 7. The flow 900 can include an ultrasound input device with a self-mixing circuit 906, an analog integrator circuit 920, and an integrated voltage output 926.

The set of subsequent signals from plot 902 can be passed through the self-mixing circuit 906 to generate a set of squared subsequent signals 910A, 910B, 910C, 910D, 910E as depicted in the second plot 908. The self-mixing circuit 906 can effectively multiply every analog value by itself over time. As a result, the second plot 908 can depict squared voltage as a function of time (e.g., $V^2(t)$). Due to the nature of squares, and thus the nature of self-mixing circuit 906, the set of squared subsequent signals 910A, 910B, 910C, 910D, 910E will always be positive.

The set of squared subsequent signals 910A, 910B, 910C, 910D, 910E can be passed to an analog integrator circuit 920. The analog integrator circuit 920 can integrate the set of squared subsequent signals 910A, 910B, 910C, 910D, 910E within the energy measurement window 916 to generate an integrated voltage output 922. The integrated voltage output 922 can be an analog representation of the total energy within the energy measurement window 916 over time. In some cases, an accumulator can be used instead of an analog integrator circuit 920.

In some cases, an optional negative bias current circuit 924 can be applied to the analog integrator circuit 920 to offset information not associated with a touch event. The negative bias current circuit 924 can constantly drain charge out of the analog integrator circuit 920 during integration. When an optional negative bias current circuit 924 is used, the voltage output 922 can be proportional to the energy of the signal minus the energy of the negative bias current circuit 924.

The voltage output 922 can be processed by a low-speed ADC 930. The voltage output 922 of the integrated energy within the energy measurement window 916 can remove the need to generate a high frequency digital output and, as a result, the low-speed ADC can use less power and can be fabricated on a smaller chip area.

Figure 10:
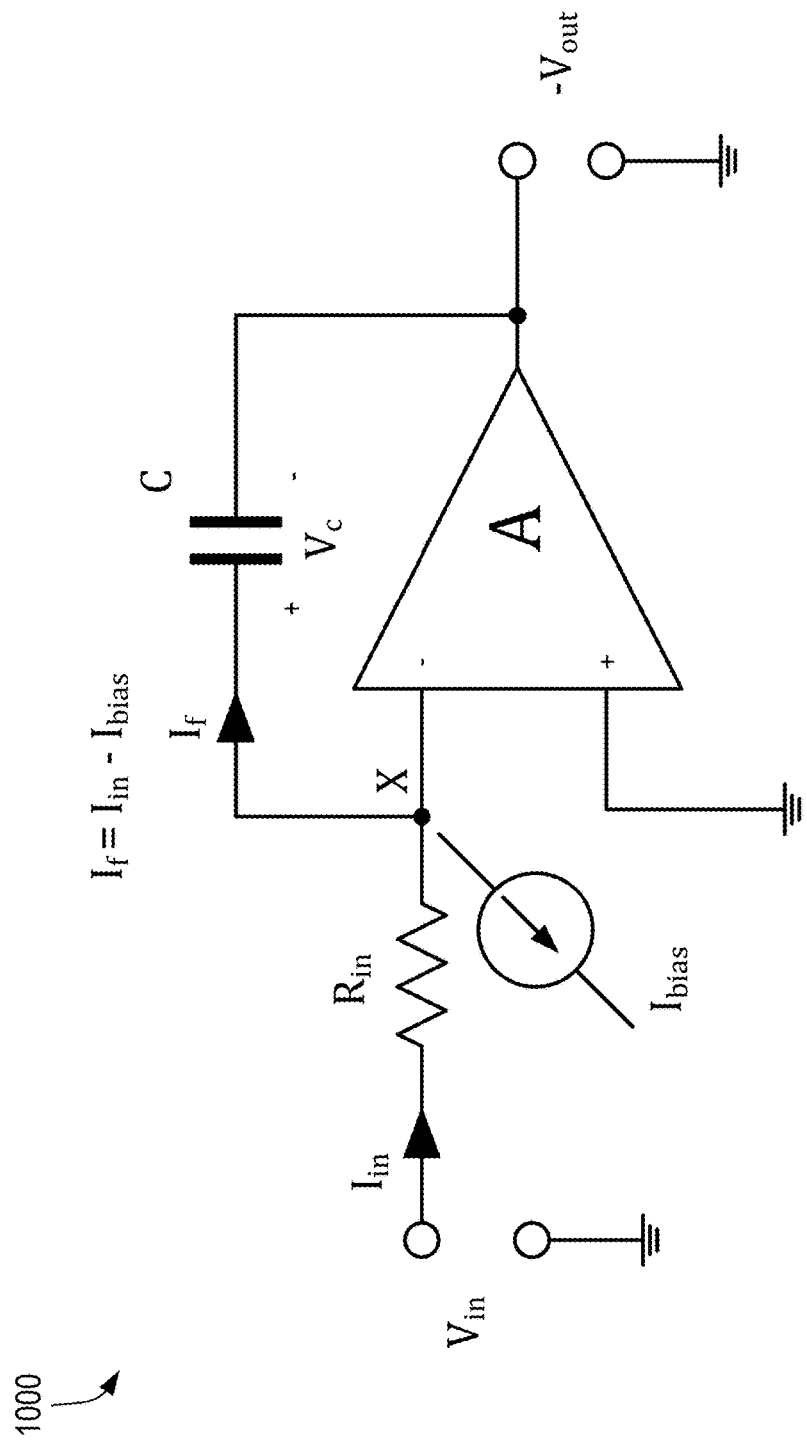
FIG. 10 is a schematic circuit diagram depicting an analog integrator with a negative bias current circuit according to certain aspects of the present disclosure.

FIG. 10 is a schematic circuit diagram depicting an analog integrator 1000 with a negative bias current according to certain aspects of the present disclosure. The analog integrator 1000 negative bias can be the analog integrator circuit 920 and optional negative bias current circuit 924 of FIG. 9.

The analog integrator 1000 can receive an input voltage ($V_{in}$) through a resistor KO to obtain an input current ($I_{in}$). A capacitor (C) can be charged by a charging current ($I_f$) to generate the integrated signal, which can feed the voltage output ($V_{out}$). Item (A) is an op-amp. A negative biasing current (bias) can be applied at point X to drain charge out of the analog integrator 1000, thus resulting in a reduced charging current ($I_f$). Therefore, the charging current can be calculated as $I_f = I_{in} - I_{bias}$.

C. Energy Measurement Windowing

Figure 11:
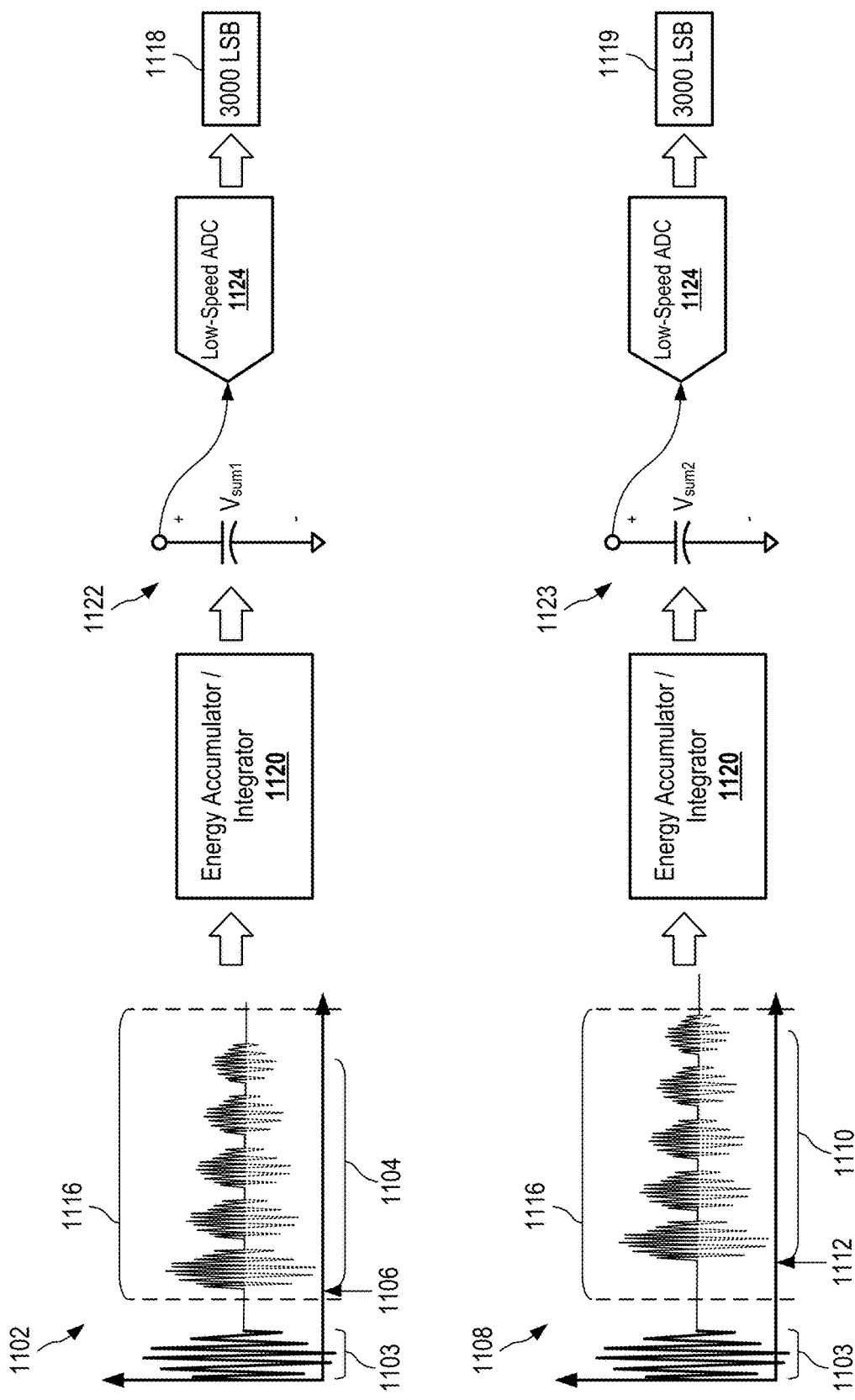
FIG. 11 is a schematic diagram of a flow for processing ultrasound signals depicting the reduced effects of reflected ultrasonic signal time-of-flight changes on touch input detection within an energy measurement window according to certain aspects of the present disclosure.

FIG. 11 is a schematic diagram of a flow for processing ultrasound signals depicting the reduced effects of time-of-flight changes on touch input detection within an energy measurement window according to certain aspects of the present disclosure. In an ultrasound imaging system or proximity detection system, an accurate time-of-flight is critical to determine the distance of objects in a field of view from an ultrasonic transducer. In contrast with imaging and proximity systems, the distance to the first and second surface of the material layer in the ultrasound input device can be provided and a touch input can be detected without accounting for changes in time-of-flight. FIG. 11 shows a first plot 1102 where a first set of reflected ultrasonic signals 1104 is received starting at a first time 1106 and a second plot 1108 where a second set of reflected ultrasonic signals 1110 is received at a second time 1112. The first set of reflected ultrasonic signals 1104 is passed through an energy accumulator or integrator circuit 1120 to generate an output voltage 1122 (e.g., $V_{sum1}$) that can be fed into a low-speed ADC 1124 and processed to obtain an output value 1118 (e.g., 3000 LSB where LSB stands for least-significant bit). The second set of reflected ultrasonic signals 1110 is passed through an energy accumulator or integrator circuit 1120 to generate an output voltage 1123 (e.g., $V_{sum2}$) that can be fed into a low-speed ADC 1124 and processed to obtain an output value 1119 (e.g., 3000 LSB where LSB stands for least-significant bit). The output values 1118, 1119 can be representative of the pulse reflection energy during the energy measurement windows 1116 of plots 1102, 1108. Despite the different starting times of the first set of reflected ultrasonic signals 1104 and the second set of reflected ultrasonic signals 1110 (e.g., first time 1106 and second time 1112), the output values 1118, 1119 can be the same or substantially the same since the entire first set of reflected ultrasonic signals 1104 and entire second set reflected ultrasonic signals 1110 each fit within the energy measurement window 1116.

Thus, the ultrasonic input device can be insensitive to time-of-flight, at least to a degree (e.g., within the energy measurement window). In some cases, advanced windowing techniques, such as those disclosed herein, can further improve the ultrasonic input device's insensitivity to time-of-flight. As a result, the surface of the ultrasonic input device (e.g., material layer) need not be entirely flat and/or the alignment of the ultrasonic input device against a material (e.g., material layer) need not be exactly at 90° (e.g., the angle between the propagation direction of the ultrasonic transducer and the surface of the material layer). Further, the insensitivity to time-of-flight can permit some insensitivity to varying indexes of refraction through which the ultrasonic signals pass (e.g., a material layer having somewhat inconsistent indices of refraction throughout).

As shown in FIGS. 6-9 and 11, the energy of the reflected ultrasonic signals (e.g., reflected echoes and standing waves) is summed or integrated over an energy measurement window. This energy is correlated to the condition of a touch input and thus can be used for input touch detection. The energy measurement window 1116 can be sized to include the pulse time of the ultrasonic signal and account for changes in the time-of-flight due to temperature, stack variations (e.g., variations in the materials making up the ultrasonic input device), etc. The energy measurement window 1116 can reduce errors due to variations in the time-of-flight. The ultrasonic touch device can determine input touch contact based on a specific threshold.

Figure 12:
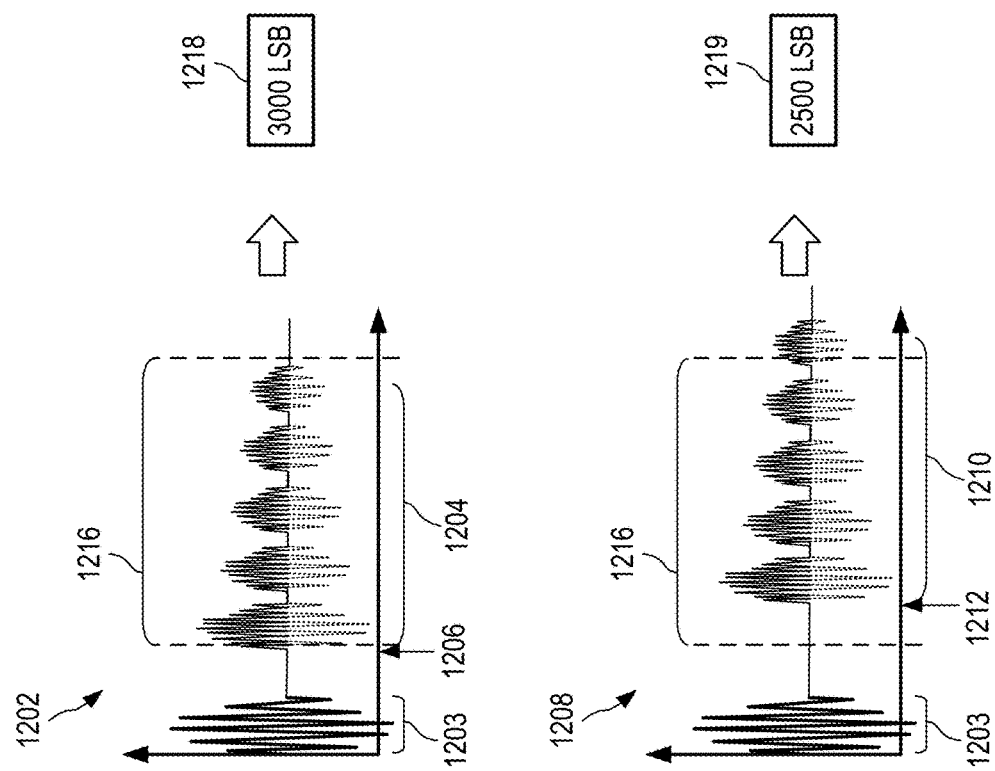
FIG. 12 is a schematic diagram of an abbreviated flow for processing ultrasound signals depicting the heightened effects of reflected ultrasonic signal time-of-flight changes on touch input detection outside of an energy measurement window.

FIG. 12 is a schematic diagram of an abbreviated flow for processing ultrasound signals depicting the heightened effects of reflected ultrasonic signal time-of-flight changes on touch input detection outside of an energy measurement window. FIG. 12 shows a first plot 1202 where a first set of reflected ultrasonic signals 1204 is received starting at a first time 1206 and a second plot 1208 where a second set of reflected ultrasonic signals 1210 is received at a second time 1212. The first set of reflected ultrasonic signals 1204 is passed through an energy accumulator or integrator circuit 1220 to generate an output voltage 1222 (e.g., $V_{sum1}$) that can be fed into a low-speed ADC 1224 and processed to obtain an output value 1218 (e.g., 3000 LSB where LSB stands for least-significant bit). The second set of reflected ultrasonic signals 1210 is passed through an energy accumulator or integrator circuit 1220 to generate an output voltage 1223 (e.g., $V_{sum2}$) that can be fed into a low-speed ADC 1224 and processed to obtain an output value 1219 (e.g., 2500 LSB where LSB stands for least-significant bit). The output values 1218, 1219 can be representative of the pulse reflection energy during the energy measurement windows 1216 of plots 1202, 1208.

As depicted in FIG. 12, because nearly all of the first set of reflected ultrasonic signals 1204 fits within the energy measurement window 1216, but a smaller portion of the second set of reflected ultrasonic signals 1210 fits within the energy measurement window 1216, output value 1218 is greater than output value 1219. As depicted in FIG. 12, the output values 1218, 1219 differ by 500 LSB. If the reflected ultrasonic signals fall outside of the energy measurement window 1216, some of the measured pulses may be cut off from being measured and thus the ultrasonic input device may be susceptible to time-of-flight variations (e.g., variations that would cause a difference in first time 1206 and second time 1212).

Figure 13:
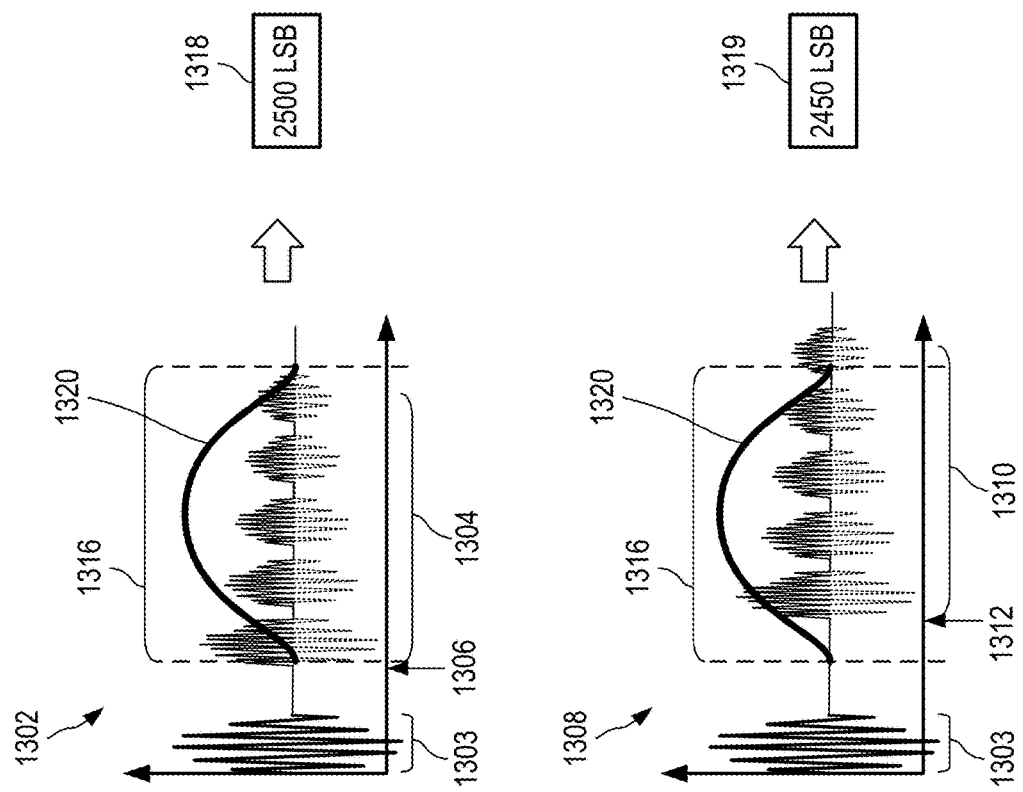
FIG. 13 is a schematic diagram of a flow for processing ultrasound signals depicting the minimal effects of reflected ultrasonic signal time-of-flight changes on touch input detection outside of an energy measurement window when window shaping is used according to certain aspects of the present disclosure.

FIG. 13 is a schematic diagram of a flow for processing ultrasound signals depicting the minimal effects of reflected ultrasonic signal time-of-flight changes on touch input detection outside of an energy measurement window when window shaping is used according to certain aspects of the present disclosure. FIG. 13 shows a first plot 1302 where a first set of reflected ultrasonic signals 1304 is received starting at a first time 1306 and a second plot 1308 where a second set of reflected ultrasonic signals 1310 is received at a second time 1312. The first set of reflected ultrasonic signals 1304 is passed through an energy accumulator or integrator circuit to generate an output voltage (e.g., $V_{sum1}$) that can be fed into a low-speed ADC and processed to obtain an output value 1318 (e.g., 2500 LSB where LSB stands for least-significant bit). The second set of reflected ultrasonic signals 1310 is passed through an energy accumulator or integrator circuit to generate an output voltage (e.g., $V_{sum2}$) that can be fed into a low-speed ADC and processed to obtain an output value 1319 (e.g., 2450 LSB where LSB stands for least-significant bit). The output values 1318, 1319 can be representative of the pulse reflection energy during the energy measurement windows 1316 of plots 1302, 1308.

Unlike FIG. 12, an energy measurement window envelope 1320 is used in conjunction with the energy measurement window 1316. The energy measurement window envelope 1320 scales portions of the signal within the energy measurement window 1316 such that portions near the edges of the energy measurement window 1316 are given less weight than portions near the center of the energy measurement window 1316. Thus, despite small variations near the ends of the energy measurement window 1316, the resultant output values will be mostly based on the signals measured within the center of the energy measurement window 1316. The energy measurement window envelope 1320 is depicted in FIG. 13 as having a particular flared bell shape, although any suitable shape can be used, including symmetrical and non-symmetrical shapes. The vertical extent of the energy measurement window envelope 1320 as depicted in FIG. 13 can represent any suitable scale, such as 0% to 100%. In some cases, the energy measurement window envelope 1320 can include amplifying signals near the center of the energy measurement window 1316, such as to values above 100% of the original signal at that time.

As depicted in FIG. 13, because of the use of an energy measurement window envelope 1320, the signals (e.g., first set of reflected ultrasonic signals 1304 and second set of reflected ultrasonic signals 1310) are weighted so the portions of the signals nearest the center of the energy measurement window 1316 are given more weight than the portions nearest the edges of the energy measurement window 1316, thus de-emphasizing any portions cut off by the start or end of the energy measurement window 1316. As a result, the output values 1318, 1319 are much closer than output values 1218, 1219 of FIG. 12. As depicted in FIG. 13, the output values 1318, 1319 only differ by 50 LSB. Thus, as a result of an energy measurement window envelope 1320, the ultrasonic input device can become less susceptible to time-of-flight variations.

Figure 14:
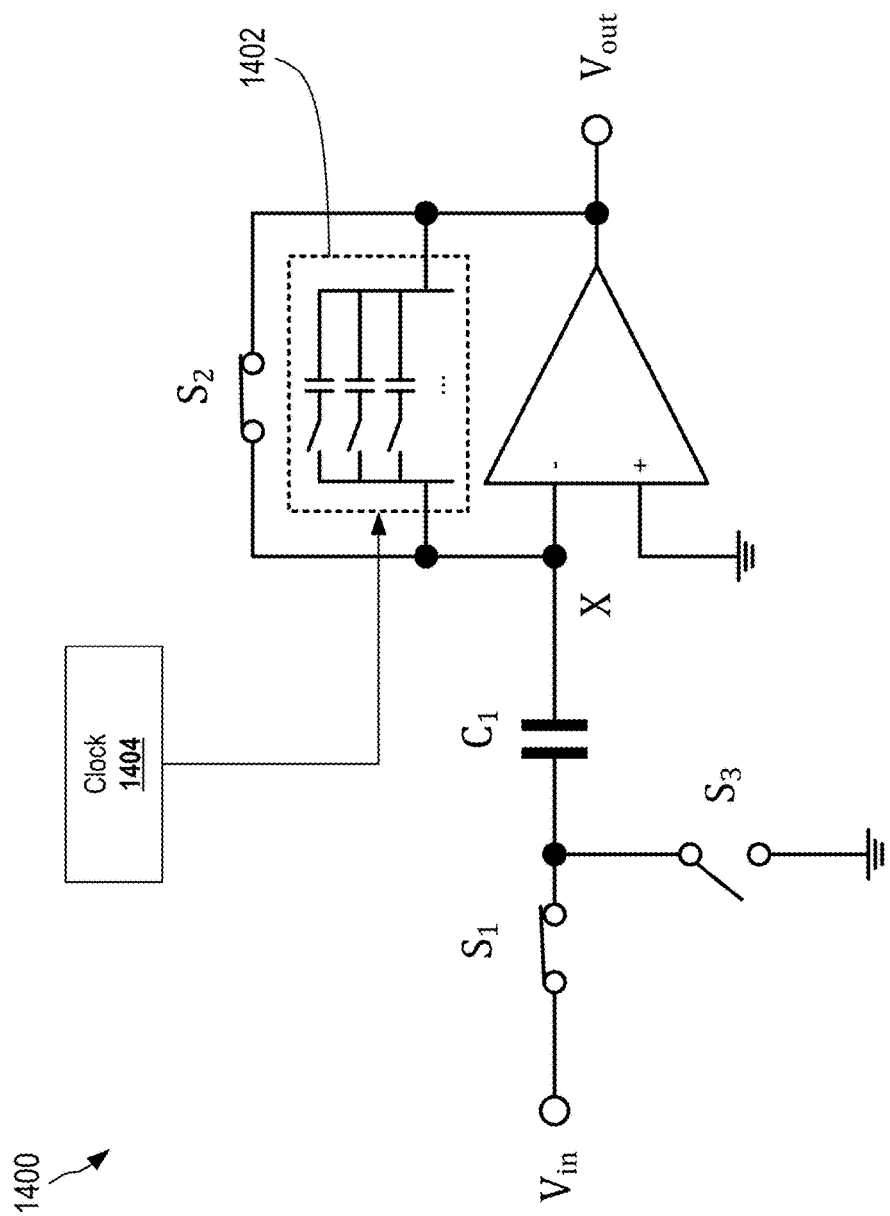
FIG. 14 is a schematic circuit diagram depicting a window shaping circuit according to certain aspects of the present disclosure.

FIG. 14 is a schematic circuit diagram depicting a window shaping circuit 1400 according to certain aspects of the present disclosure. The window shaping circuit 1400 can generate an energy measurement window having an energy measurement window envelope (e.g., energy measurement window 1316 having energy measurement window envelope 1320 of FIG. 13). The window shaping circuit 1400 can operate as a traditional analog accumulator circuit with the addition of an adjustable capacitor 1402. The adjustable capacitor 1402 can take any suitable form, such as a switched ladder of different sized capacitors. The choice of capacitor size for adjustable capacitor 1402 over time can result in an adjustment of gain on the analog accumulator circuit over time. In some cases, the adjustable capacitor 1402 can be driven by a clock 1404 or other source to determine when to chance capacitance. In some cases, the adjustable capacitor 1402 can be used with an analog sampling circuit, such as analog sampling circuit 806 of FIG. 8, and the adjustable capacitor 1402 can be changed with different sample numbers (e.g., n of V(n)).

Figure 15:
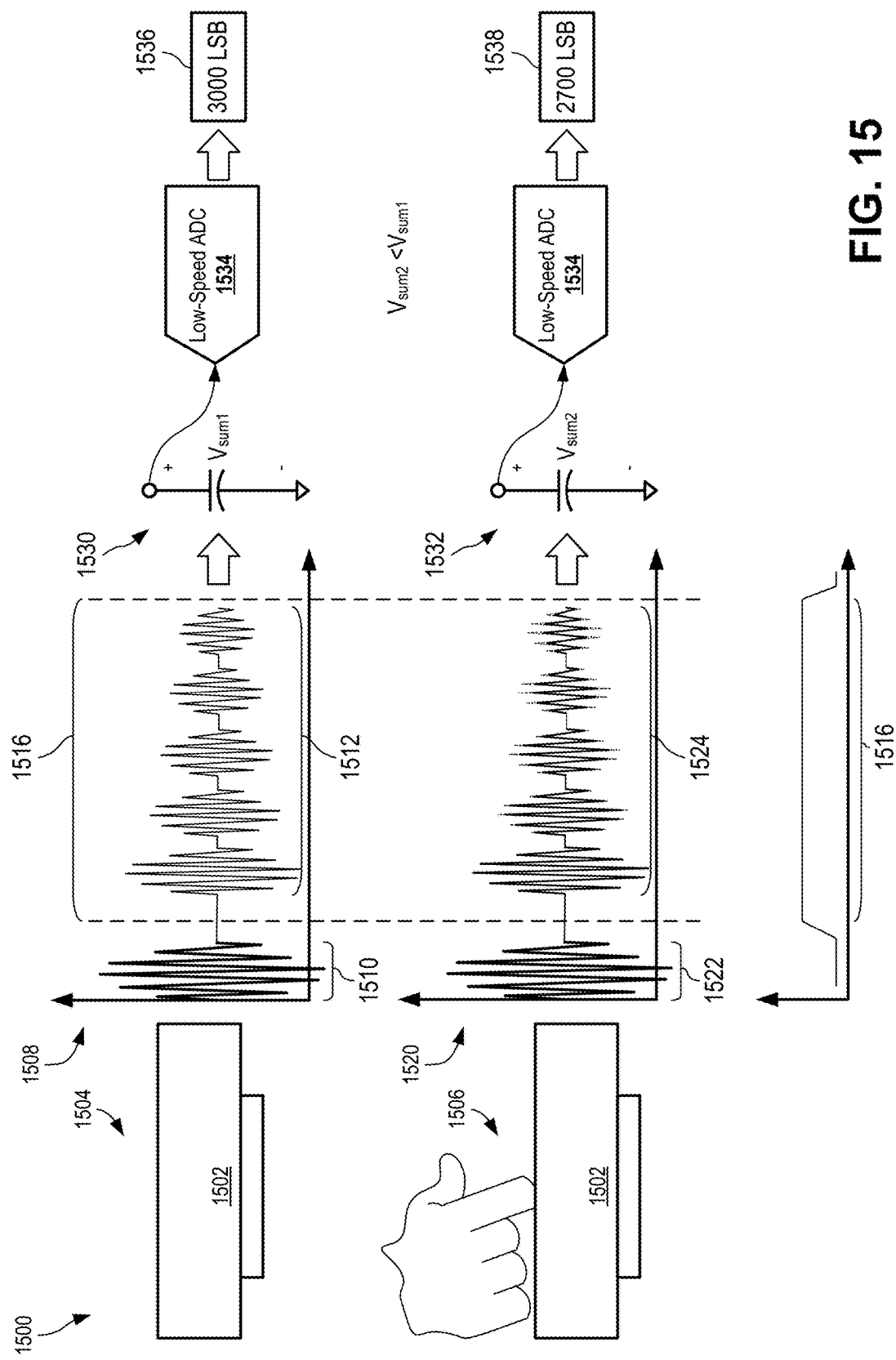
FIG. 15 is a schematic diagram depicting a flow for processing ultrasound signals to detect a touch input using the amplitude of reflected ultrasonic signals according to certain aspects of the present disclosure.

FIG. 15 is a schematic diagram depicting a flow 1500 for processing ultrasound signals to detect a touch input using the amplitude of reflected ultrasonic signals according to certain aspects of the present disclosure. FIG. 15 shows an ultrasound input device 1502 with no touch input 1504 and with a touch input 1506. A first plot 1508 associated with the ultrasound input device 1502 with no touch input 1504 shows a transmitted signal 1510 and a first set of reflected signals 1512. The first set of reflected signals 1512 can be processed, as disclosed herein, to generate an output voltage 1530 (e.g., $V_{sum1}$), which can be provided to a low-speed ADC 1534 and further processed to generate a first output 1536. The first output 1536 can be representative of the energy of the first set of reflected signals 1512 within the energy measurement window 1516. A second plot 1514 shows a transmitted signal 1522 and a second set of reflected signals 1512. The second set of reflected signals 1524 can be processed, as disclosed herein, to generate an output voltage 1532 (e.g., $V_{sum2}$), which can be provided to a low-speed ADC 1534 and further processed to generate a second output 1538. The second output 1538 can be representative of the energy of the second set of reflected signals 1524 within the energy measurement window 1516.

An energy measurement window envelope 1516 (e.g., an envelope similar to energy measurement window envelope 1320 of FIG. 13) can be applied to the first set of reflected signals 1512 and the second set of reflected signals 1524.

The first output 1536 and the second output 1538 can be compared to determine whether a touch input (e.g., touch event) has occurred. For example, if the second output 1538 is lower than the first output 1536 by a predetermined amount and/or if the second output 1538 is lower than a threshold value, the ultrasound input device can generate a signal indicating a touch input is present on a surface. Since the output voltages 1530, 1532 are indicative of the first output 1536 and second output 1520, respectively, the output voltages 1530, 1532 can be used to determine whether a touch input has occurred. In some embodiments, only a single output, such as the first output 1518, can be compared to a reference value. The reference value can be established at the time of manufacturing and/or be updated based on background characteristics measured by or communicated to the device, such as temperature.

D. Touch Input Error Prevention

Figure 16:
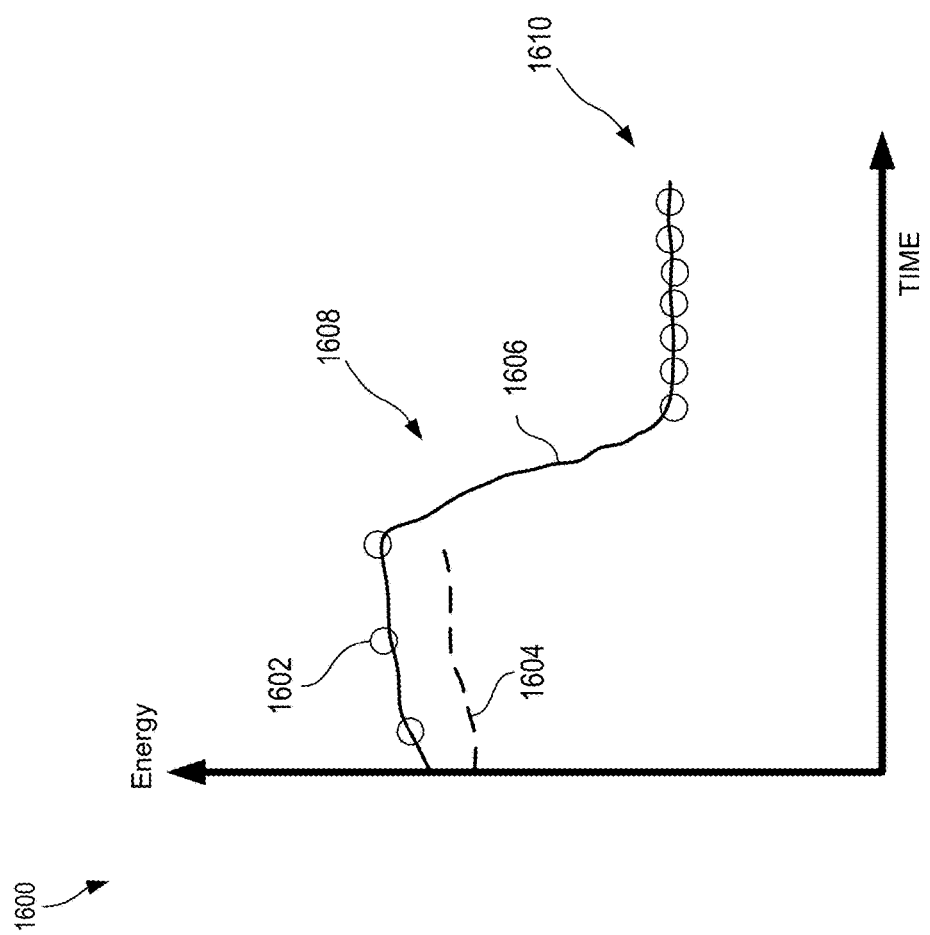
FIG. 16 is a chart depicting reflected ultrasonic signal measurements made using an ultrasound input device and illustrating techniques to improve touch input detection according to certain aspects of the present disclosure.

FIG. 16 is a chart 1600 depicting reflected ultrasonic signal measurements made using an ultrasound input device and illustrating techniques to improve touch input detection according to certain aspects of the present disclosure. The sensor readout (e.g., DC signal or other sensor data) determined by the ultrasound input device can be measured continuously or at a specific frequency depending on the application. In some embodiments, the sensor readout can be measured at a frequency of 100 Hz. An individual measurement 1602 can correspond to the energy measurement within an energy measurement window. One or more individual measurements can be used to determine a current state 1606. The current state can be defined by the current individual measurement 1602 or by a best-fit line based on two or more individual measurements. In some embodiments, the best-fit line can be calculated using a least-squares method. A plurality of individual measurements can be used to determine a moving average threshold 1604.

The current state 1606 and the moving average threshold 1604 can be used to detect a touch event. The moving average threshold 1604 can be used to determine a sudden signal drop that can trigger a touch input event. For example, the system can detect a "hand-touch" effect only if a "rapid signal change" 1608 from a current state 1606 is detected. A rapid signal change 1608 can be associated with a sudden signal drop on all or many channels, and can be considered a touch input event. A threshold to detect the rapid signal change 1608 can be the moving-average threshold 1604 when no hand-touch event is detected. (Dynamic threshold). In some embodiments, the rapid signal change 1608 can be a pre-programmed static threshold. The rapid signal change 1608 event can trigger a touch input event and cause the ultrasound input device to generate a signal indicating a touch input on a surface of the device. For a rapid signal change 1608 event, multiple measurements 1610 are made to ensure signal did actually drop and does not jump back up, such as to its original value. For example, a hard press by a user may result in a dropping sensor readout, but will still provide a continuous signal. During the multiple measurements 1610, if the signal rapidly returns to a higher value, such as the value previously seen before the suspected touch event, the ultrasound input device can recognize the temporary signal drop as a false touch event and not classify it as a touch event. Multiple measurements 1610 can occur over a very short timeframe (e.g., on the order of tens or hundreds of milliseconds). In some embodiments, a "gradual signal change" can be treated as temperature change but not hand touch event because the moving average will adjust with each individual measurement 1602 at a rate based on the number of measurements used to determine the moving average.

In some cases, a threshold 1604 can be based on a calculation other than a moving average calculation. In some cases, the threshold 1604 is simply some function of past history (e.g., historical measurements), such as a function of the past x number of measurements. In some cases, past measurements can be weighted, such as more recent measurements being weighted higher than measurements taken longer ago. In such cases, the response time of the ultrasonic input device can be adjusted based on the weightings of the past x measurements. For example, a threshold can be calculated as a function of historical values according to Threshold=$f(X[n-1], X[n-2], \ldots, X[n-m])$ where $X[n]$ is the n-th sensor readout (or the current sensor readout). In another example, the threshold can be calculated as a function of weighted historical values according to Threshold=$w_1 X[n-1]+w_2 X[n-2], \ldots, w_m X[n-m]$ where $w_n$ is a weighting parameter for the n-th sensor readout. In some cases, weighting parameters can be trained using machine learning, such as described in further detail herein.

In some cases, in addition to or instead of determining a rapid signal change 1608 based on measurements themselves, the determination can be made using a slope of a set of measurements, such as a slope of the current measurement and some number of past measurements.

Figure 17:
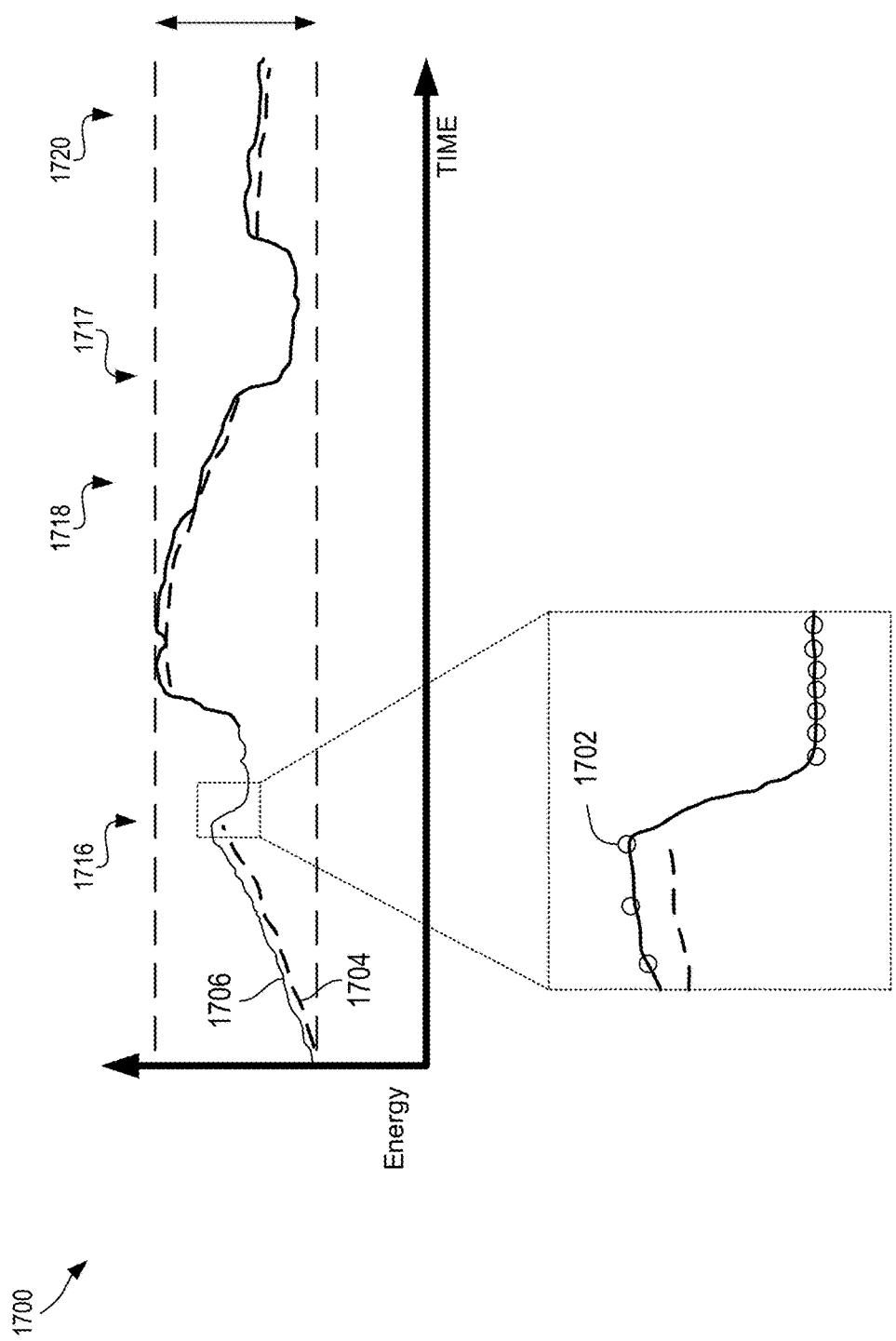
FIG. 17 is a chart depicting reflected ultrasonic signal measurements made using an ultrasound input device and illustrating additional techniques to improve touch input detection according to certain aspects of the present disclosure.

FIG. 17 is a chart 1700 depicting reflected ultrasonic signal measurements made using an ultrasound input device and illustrating additional techniques to improve touch input detection according to certain aspects of the present disclosure. A portion of chart 1700 is depicted as chart 1600 of FIG. 16. Chart 1700 shows that signal variation over time may occur due to various factors, such as temperature changes, however the ultrasonic input device may be able to discern that these variations are not touch events. However, sudden signal drops between consecutive measurements can be indicative of a touch event. Current state 1706 can be similar to current state 1606 of FIG. 16. The moving average threshold 1704 can be similar to threshold 1604 of FIG. 16. This threshold 1704 can be based in part on a moving average of previous measurements of the current state 1706, such as a moving average of previous measurements offset by a given amount. This type of threshold 1704 can be known as a dynamic threshold, although other threshold techniques can be used.

At region 1716, a touch event occurs. When the touch event occurs, the current state 1706 quickly drops. As depicted in the callout portion of chart 1700, various measurements 1702 are shown. Each measurement 1702 can be separated in time based on a measurement frequency. For example, each measurement 1702 can be 0.01 seconds apart (e.g., at 100 Hz), although other frequencies can be used. A sudden drop can be detected between two or more consecutive measurements 1702. When the sudden drop in current state 1706 falls below the threshold 1704, a touch event can be considered to have occurred. Region 1717 depicts another touch event.

At region 1718 and region 1720, gradual changes in temperature of the ultrasonic sensor and surface to which the sensor is coupled can result in gradual changes in current state 1706. Because of the relatively slow changes in the current state 1706, the threshold 1704, which is based on a moving average of the current state 1706, will make changes as well. Since the threshold 1704 is able to compensate for slow changes in the current state 1706, such as those that occur due to temperature changes, these slow changes in current state 1706 do not pass the threshold 1704 and therefore do not trigger touch events. Furthermore, since the threshold 1704 is dynamically updating, the threshold 1704 is able to operate properly at different temperatures. In some cases, changes in current state 1706 due to temperature variation can be even larger than contrast resulting from an actual hand touch, but since these temperature variations are much slower than the changes in current state 1706 due to a touch event, they are not detected as touch events.

III. Multifrequency Touch Detection

FIG. 18 is a chart depicting a temperature dependence of reflected ultrasonic signals according to certain aspects of the present disclosure. The reflected ultrasonic signals received by an ultrasound input device can include the main signal 1802 and any unwanted signals 1804. The main signal travels a first path through the material layer and is associated with a first time-of-flight (TOF) and any unwanted signals 1804 travel a second path through the material layer and are associated with a second TOF. The speed of sound in a material layer depends on the temperature of the material layer. Due to speed of sound changes as a result of temperature changes, the main signal 1802 and the unwanted signals 1804 travel through different acoustic paths, and the associated first TOF and second TOF change a different amount accordingly. This creates a net TOF difference $\Delta t(T)$ 1806 between the main signal 1802 and the unwanted signal 1804 which change with temperature T. This then translates into a phase delay difference $\Delta\phi(T)$ between the main signal 1802 and the unwanted signal 1804. And thus yields different integrated signal strength difference Dout(T) as depicted by line 1810.

Figure 19:
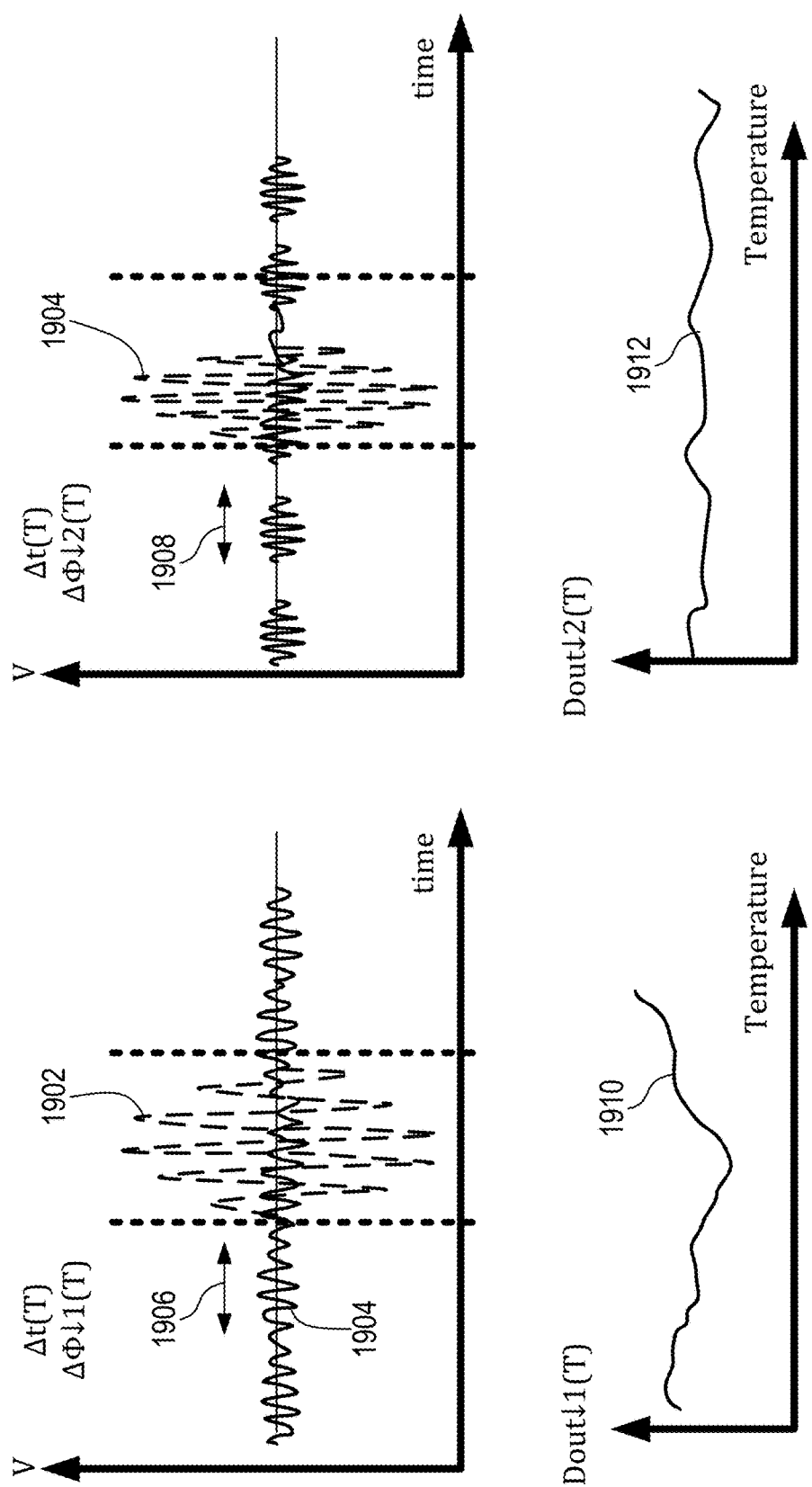
FIG. 19 is a set of charts depicting time-of-flight temperature dependence of a two frequency method of detecting a touch input according to certain aspects of the present disclosure.

FIG. 19 is a set of charts depicting TOF temperature dependence of a two frequency method of detecting a touch input according to certain aspects of the present disclosure. The charts can be similar to the charts of FIG. 18. In a multi-frequency ultrasound input device, different frequencies will have different temperature effects resulting in a different TOF for each signal. The multi-frequency ultrasound input device can process a "finger touch" (e.g., touch event) when a signal drop is detected in a threshold number of frequency channels. For example, two different methods can detect whether a finger touched the ultrasound touch input device, and the device can only process the touch event when both of the methods agree finger touch has been detected.

In a multi-frequency ultrasound touch input device, a first signal 1902 at a first frequency and a second signal 1904 at a second frequency have different background and temperature drift characteristics. For example, the first signal 1902 and the second signal 1904 experience the same $\Delta t(T)$ when temperature changes. As a result of the different temperature drift characteristics, the same $\Delta t(T)$ will translate to a different phase delay for each frequency. For example, the first signal 1902 will have a first phase delay of $\Delta\phi\downarrow 1(T)$ 1906 and the second signal 1904 will have a second phase delay $\Delta\phi\downarrow 2(T)$ 1908. The resulting difference in the phase delay can cause two different ADC output value patterns over temperature Dout$\downarrow$1 (T) and Dout$\downarrow$2(T), as depicted by lines 1910, 1912, respectively.

Therefore, signal drop can be measured in multiple frequencies in order to increase touch detection reliability and reduce false trigger detection. A touch input event can be processed if all the frequency channels detect a sudden signal drop. The multiple measurements can occur very fast (<1 ms) to make sure the sudden signal drop is not due to temperature effects.

The multi-frequency ultrasound touch input device can avoid false triggers by reducing noise associated with environmental conditions. The touch input device can immediately execute a rapid pulse-echo test to ensure the touch event is real but not a false trigger due to noise. In some embodiments, the multiple tests can happen within 1 ms.

Figure 20:
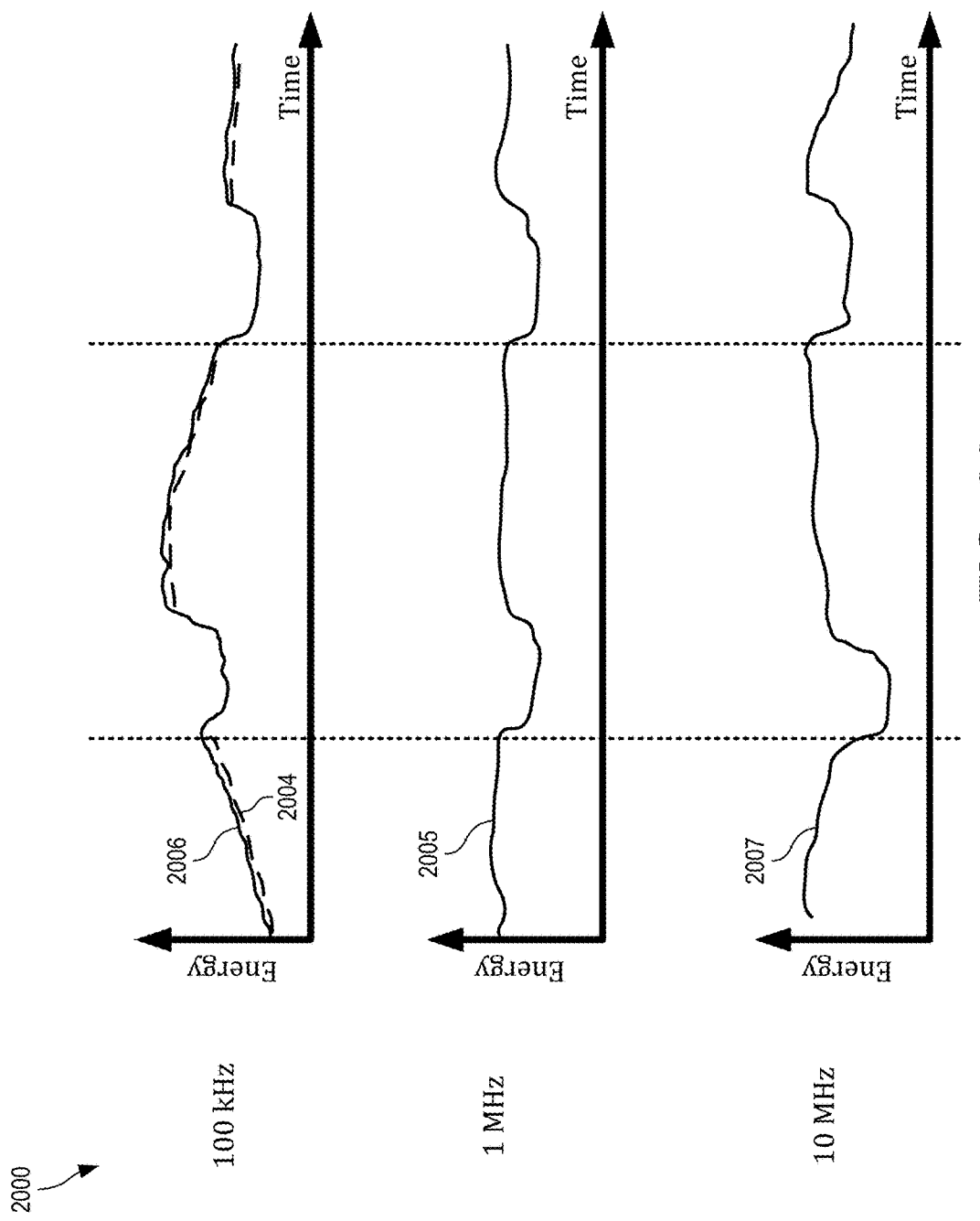
FIG. 20 is a chart depicting reflected ultrasonic signal measurements made across several frequencies using an ultrasound input device and illustrating techniques to improve touch input detection according to certain aspects of the present disclosure.

FIG. 20 is a multi-part chart 2000 depicting reflected ultrasonic signal measurements made across several frequencies using an ultrasound input device and illustrating techniques to improve touch input detection according to certain aspects of the present disclosure. Different frequencies of ultrasonic signals can exhibit different variation due to temperature changes. Thus, by sensing using multiple ultrasonic frequencies, the ultrasonic input device can compare a suspected touch event with the data from one or more other frequencies to ensure the suspected touch event is confirmed by the one or more other frequencies. The use of multiple frequencies can reduce error rates.

Line 2006 can represent energy signals associated with a 100 kHz frequency, line 2005 can represent energy signals associated with a 1 MHz frequency, and line 2007 can represent energy signals associated with a 10 MHz frequency. Line 2004 can represent a moving average threshold, such as threshold 1604 from FIG. 16. For illustrative purposes, a moving average threshold is only depicted with respect to the 100 kHz frequency, but respective thresholds can exist for each frequency used (e.g., 1 MHz and 10 MHz). While the frequencies 100 kHz, 1 MHz, and 10 MHz are used with respect to FIG. 20, any other suitable frequencies can be used. While three different frequencies are used with respect to FIG. 20, any number of different frequencies, such as two or greater than three, can be used. A touch event may be registered only if the touch event is detected across all, a majority of, or at least a threshold percentage of different frequencies being used for detection.

In some cases, instead of or in addition to driving an ultrasonic input device at different frequencies, the ultrasonic input device can drive an ultrasonic array with different phase delays to generate different beampatterns. Since different beampatterns can have different temperature characteristics, different beampatterns can be used similar to different frequencies to reduce error and confirm suspected touch events.

Figure 21:
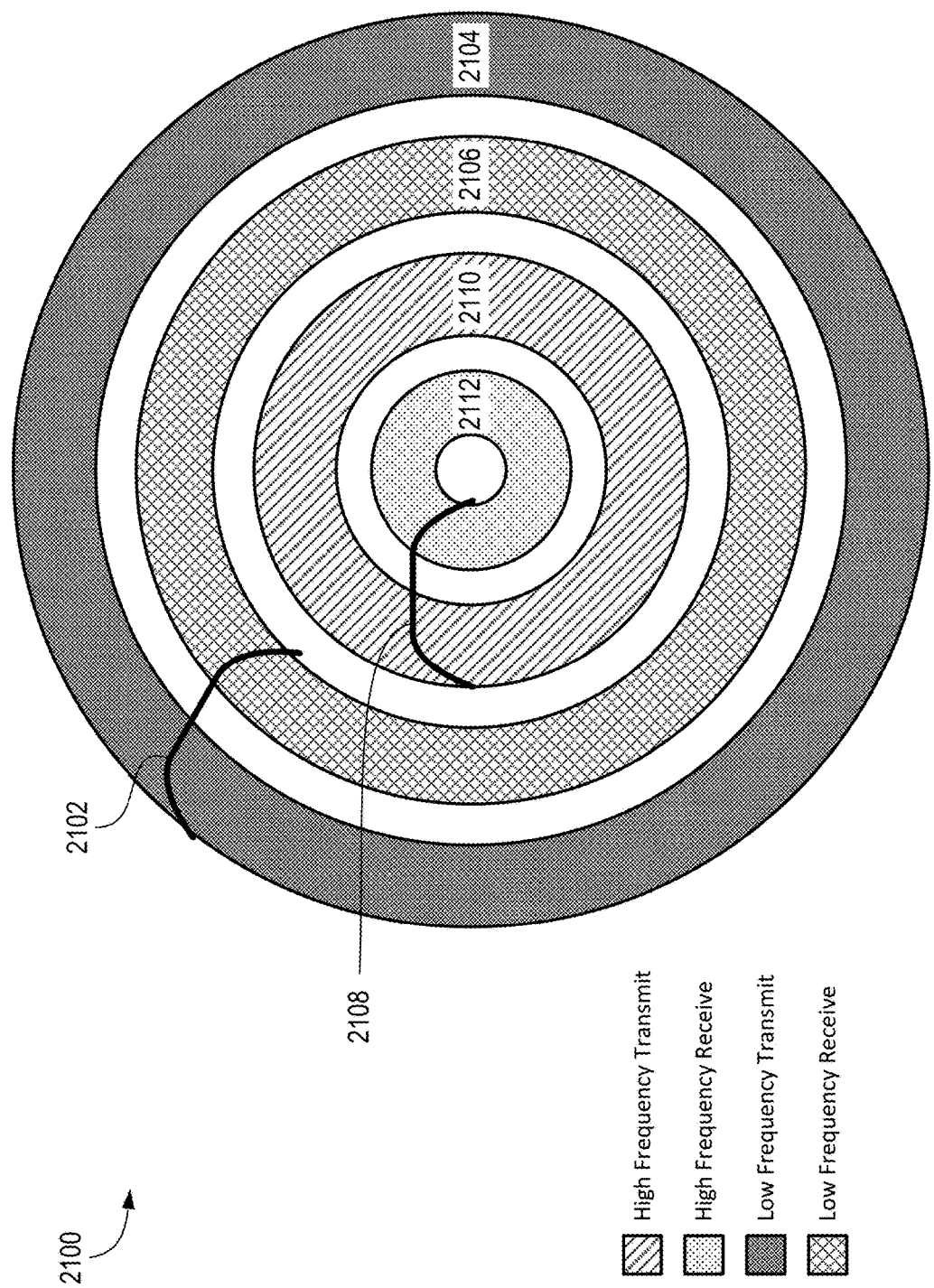
FIG. 21 is a schematic plan view depicting a two-frequency PMUT with a concentric-circular design according to certain aspects of the present disclosure.

FIG. 21 shows a plan view of a two-frequency PMUT 2100 according to certain aspects of the present disclosure. In some embodiments, a circular PMUT design can be fabricated to achieve multi-frequency transducers. The circular PMUT design can consist of multiple individual channels for transmit and receive per frequency. In some cases, the multiple channels or transducers can be arranged concentrically. For example, the two frequency PMUT 2100 includes a first transmit/receive pair 2102 associated with a low frequency. The first transmit/receive pair 2102 can include a low frequency transmit ring 2104 and a low frequency receive ring 2106. The two frequency PMUT 2100 also includes a second transmit/receive pair 2108 associated with a high frequency. The second transmit/receive pair 2108 can include a high frequency transmit ring 2110 and a low frequency receive ring 2112. In various embodiments, a circular PMUT design can include a range of multiple frequencies from 2 to 10. The range of frequencies can be from 1 MHz to 10 MHz. In some embodiments, frequencies less than 1 MHz can be used depending on the material layer and specific application. A second PMUT array can be added for TOF measurement at the 1-3 MHz range. In some cases, the ranges of frequencies used for any array can be from 30 kHz to 50 Mhz.

Figure 22:
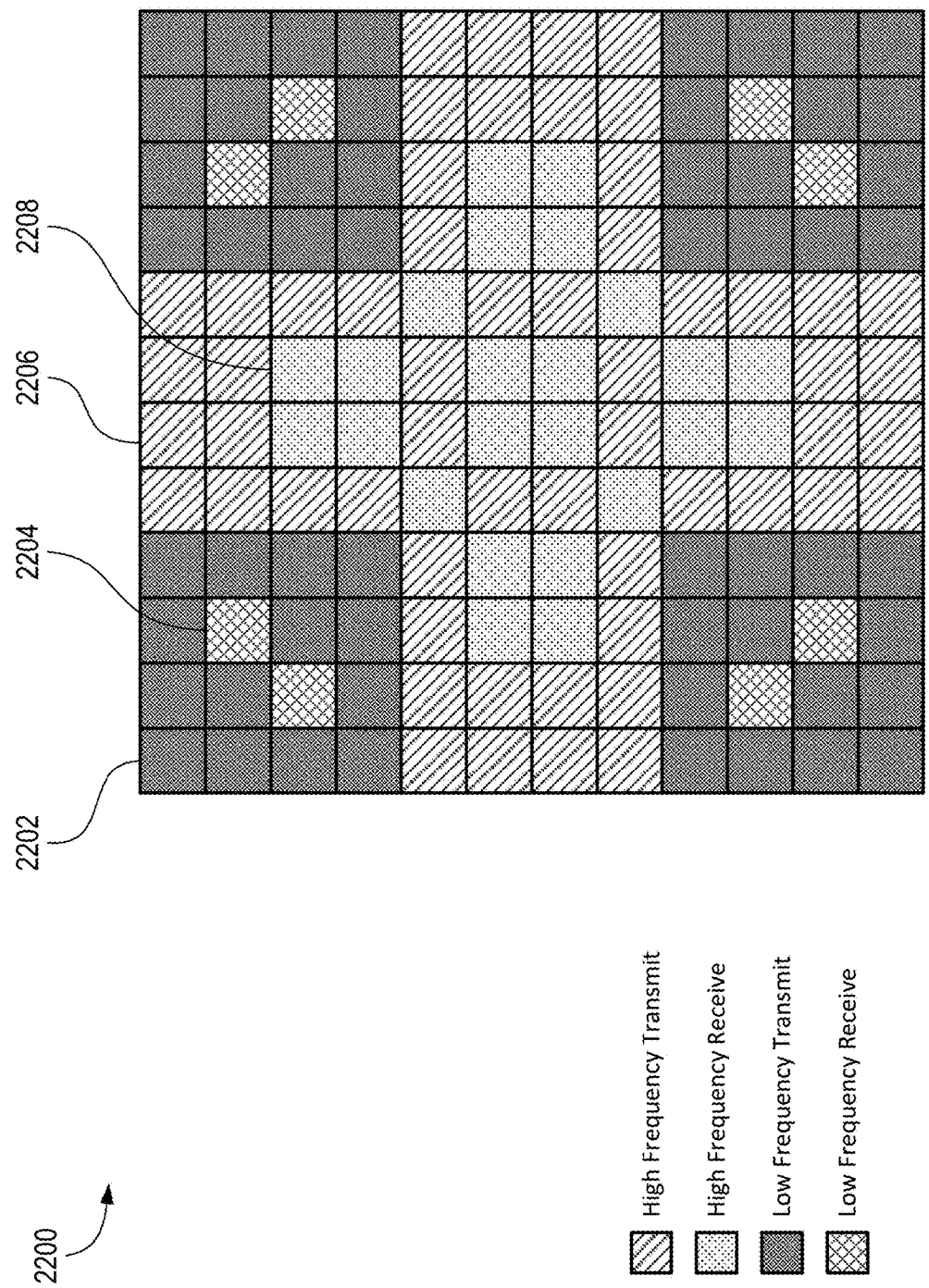
FIG. 22 is a schematic plan view depicting a multi-frequency ultrasound input device with a square design according to certain aspects of the present disclosure.

FIG. 22 is a schematic plan view depicting a multifrequency ultrasound input device 2200 with a square design according to certain aspects of the present disclosure. The square sensor design can consist of a square grid of multiple individual channels for transmit and receive per frequency. In some cases, one or more receiving channels can be positioned between multiple transmitting channels. In such cases, the position of a receiving channel between multiple transmitting channels can facilitate receiving and detecting reflected signals. In an example, the multiple-frequency input device 2200 can include various low-frequency transmitters 2202, low-frequency receivers 2204, high-frequency transmitters 2206, and high-frequency receivers 2208. The square design can include nested patterns, such as the cross-shaped nested pattern depicted in FIG. 22. Any other suitable pattern can be used. The various transmitters and receivers can be any suitable frequency, such as between 30 kHz to 50 Mhz, 1 Mhz to 10 Mhz, or any other suitable range.

IV. Machine Learning Decision Algorithm

Figure 23:
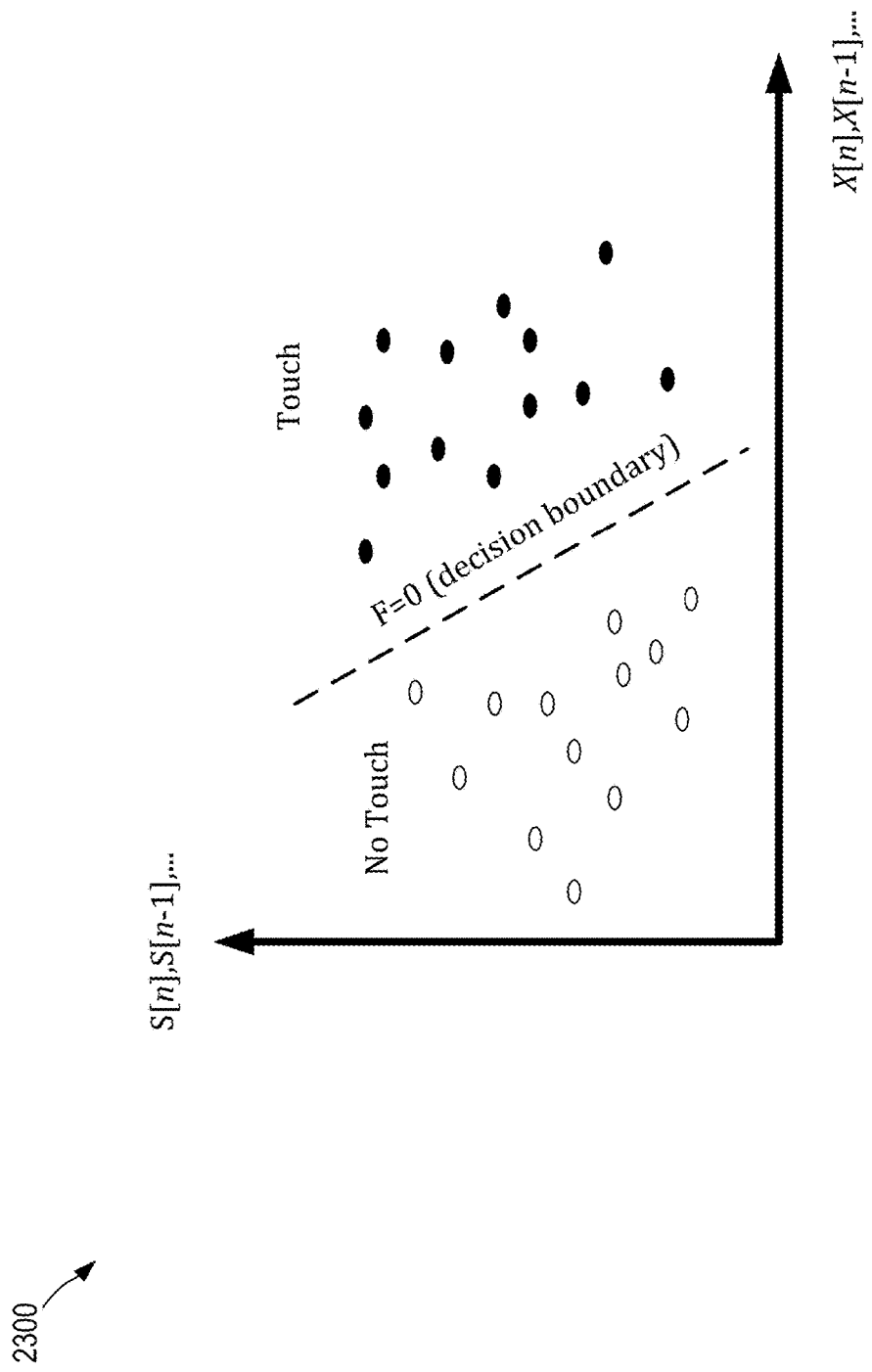
FIG. 23 is a chart depicting a machine learning decision algorithm used to improve touch detection according to certain aspects of the present disclosure.

FIG. 23 is a chart 2300 depicting a machine learning decision algorithm used to improve touch detection according to certain aspects of the present disclosure. As described with reference to FIG. 16, weighting parameters can be used to drive various decisions regarding when a touch event is detected or not detected. In some cases, a machine learning approach can take into account sensor output values and slopes between a sensor value and a previous sensor value to generate inferences that a touch event has occurred or not occurred. The machine learning approach can use a decision function (f), such as:

$$f = w_0 X[n] + w_1 X[n-1] + w_2 X[n-2] + \ldots +$$
$$w_m X[n-m] + w_{s0} S[n] + W_{s1} S[n-1] + \ldots + w_{sm} S[n-m]$$

where $w_n$ and $w_{sn}$ are weighting parameters, X[n] is the current sensor output, X[n−1] is the previous sensor output, X[n−m] is the m-th previous sensor output, S[n] is the slope of the current sensor output (e.g., as compared to an immediately prior sensor output), S[n−1] is the slope of the previous sensor output, and S[n−m] is the slope of the m-th previous sensor output. In some cases, other parameters can be used in the decision function.

The weighting parameters of the decision function can be trained over a corpus of data to generate a decision boundary between inputs that are considered touch events and inputs that are not considered touch events, as depicted in chart 2300. Thus, for any given sensor outputs and slopes of sensor outputs, a point on chart 2300 can be identified, and if that point falls above the decision boundary, those sensor outputs and slopes of sensor outputs can be considered indicative of a touch event.

V. Applications

Figure 24:
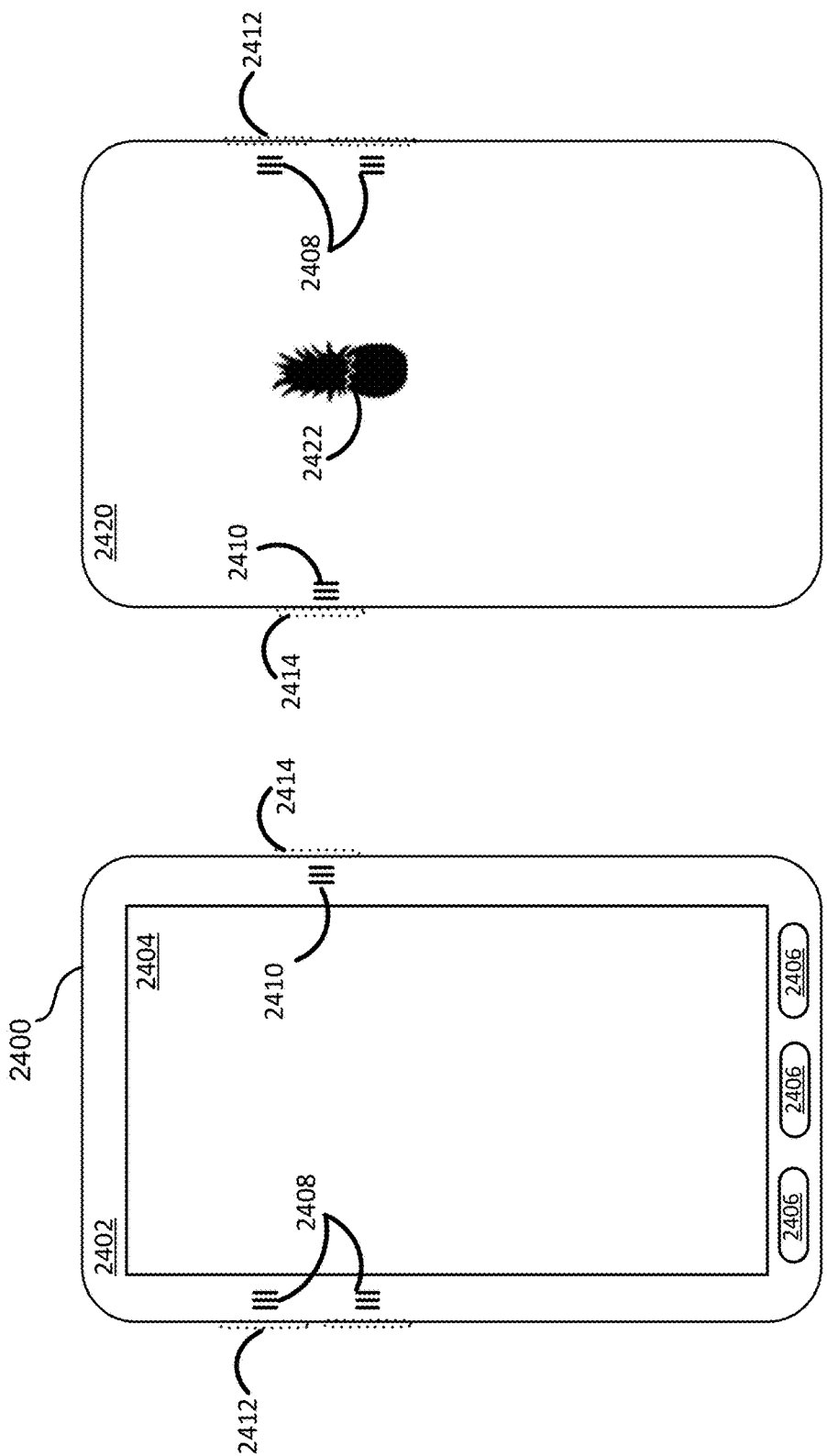
FIG. 24 is a schematic diagram depicting an electronic device with an ultrasound input device according to certain aspects of the present disclosure.

FIG. 24 is a schematic diagram depicting an electronic device with an ultrasound input device according to certain aspects of the present disclosure. The electronic device 2400 can include a case 2402, a screen 2404, one or more front facing buttons 2406, a pair of ultrasound input devices 2408, and an individual ultrasound input device 2410. The electronic device 2400 can include a processor, memory, and a network interface. In some embodiments, the ultrasound input devices can be coupled to the processor of the electronic device 2400.

In some embodiments, the pair of ultrasound input devices 2408 can define an input touch area 2412 to detect user inputs. For example, a user can contact the input touch area 2412 to adjust the volume, the brightness, etc. of the electronic device. In some embodiments, an array of ultrasound input devices can be positioned under the screen to detect touch inputs and replace or augment a capacitive touch or force touch capability of the electronic device. The individual ultrasound input device 2410 can define an input touch area 2414 to detect user inputs. The input touch area 2414 can be configured to control the device power, screen on/off, etc.

In some embodiments, an ultrasound input device can be used to detect a touch input at each of the one or more front facing buttons 2406. The ultrasound input device can replace the capacitive sensing used to detect a touch input on a fingerprint sensor. The ultrasound input device offers a low power solution to detect the touch input on the fingerprint sensor. In some embodiments, one or more ultrasound input devices can be positioned under a logo 2422 on the back 2420 of the case 2402 to detect user input.

Figure 25:
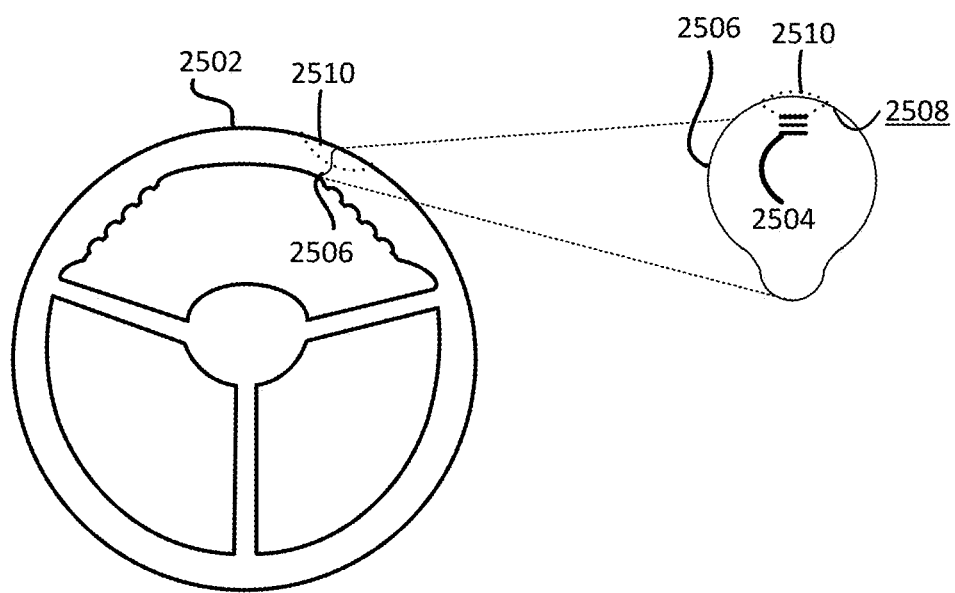
FIG. 25 is a schematic diagram depicting an automotive component with an ultrasound input device according to certain aspects of the present disclosure.

FIG. 25 is a schematic depiction of a steering wheel 2502 with an ultrasound input device 2504 according to certain aspects of the present disclosure. The ultrasound input device 2504 can be used to form a touch input area on the steering wheel 2502 to detect a touch input. The flexibility of the ultrasound input device 2504 facilitates detection of a touch input through a variety of materials used to manufacture a steering wheel such as plastic, leather, wood, etc. The cross section 2506 of the steering wheel 2502 shows the ultrasound input device coupled to a surface 2508 to form a touch input area 2510. The touch input area can be combined with a plurality of touch input areas for a applications such as cruise control, infotainment input control, cellular communications controls; and driver detection systems. For example, the ultrasound input device 2504 can be used in a driver detection system to determine if a driver's hands are in contact with the steering wheel.

Figure 26:
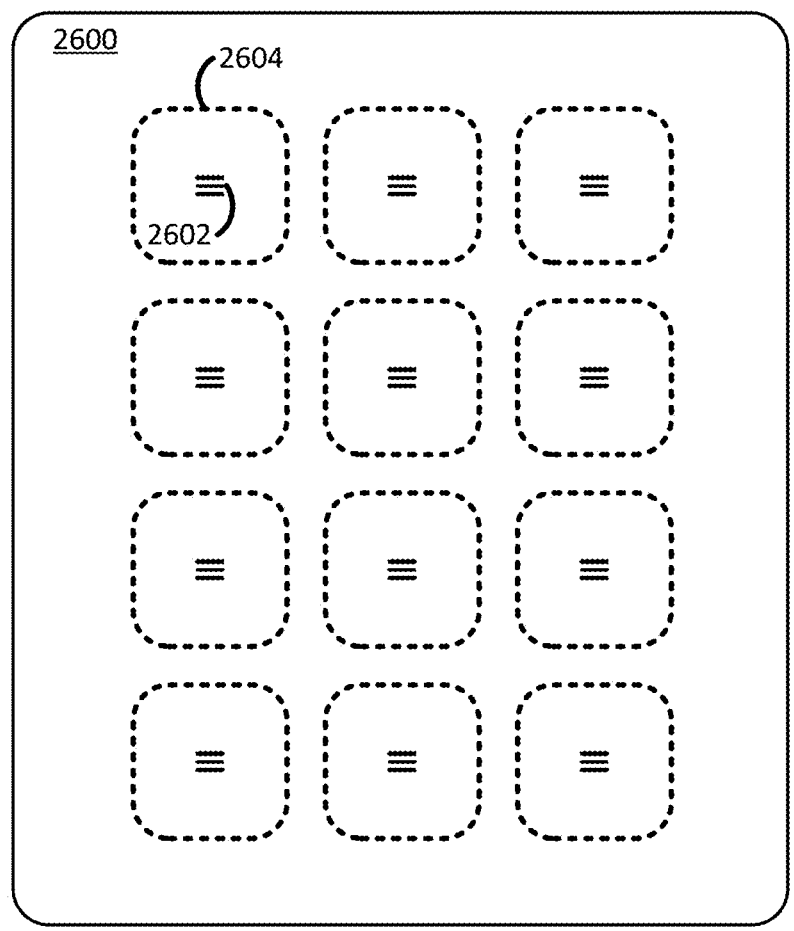
FIG. 26 is a schematic diagram depicting a keypad using an ultrasound input device according to certain aspects of the present disclosure.

FIG. 26 is a schematic depiction of a keypad 2600 using an ultrasound input device according to certain aspects of the present disclosure. The shape and materials that can be used to design a touch area with underlying ultrasound input devices are limited only be the creativity of the designer. For example, a 12-key standard telephone keypad is shown in FIG. 26. The keypad 2600 can include 12 ultrasound input devices 2602 to form a touch area 2604 for each key.

Figure 27:
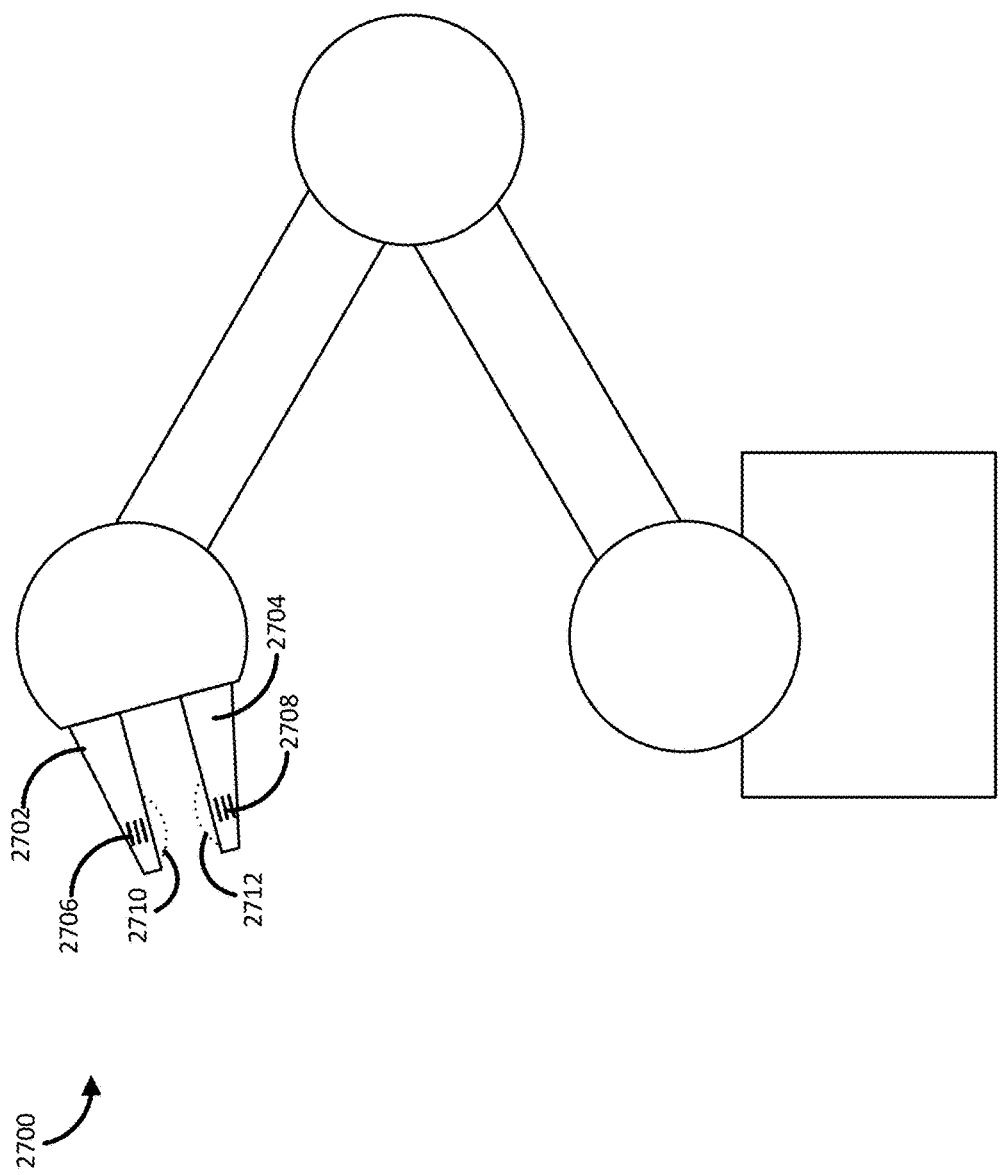
FIG. 27 is a schematic diagram depicting a robotic arm using an ultrasound input device according to certain aspects of the present disclosure.

FIG. 27 is a schematic diagram depicting a robotic arm using an ultrasound input device according to certain aspects of the present disclosure. The robotic arm 2700 can include a first finger 2702 and a second finger 2704. The ultrasound input device can be implemented as a robot finger input device. The first finger 2702 and the second finger 2704 can include a first ultrasound input device 2706 and a second ultrasound input device 2708 respectively. The first ultrasound input device 2706 can form a contact area 2710 on the surface of the first finger 2702 and the second ultrasound input device 2708 can form a second contact area 2712 on the second finger. The ultrasound input devices improve the detection capability of the robot arm because they can be integrated into fingers comprising any material. Further, the ultrasound input devices can detect a touch input without requiring a cutout and/or a different material being integrated into the finger.

Figure 28:
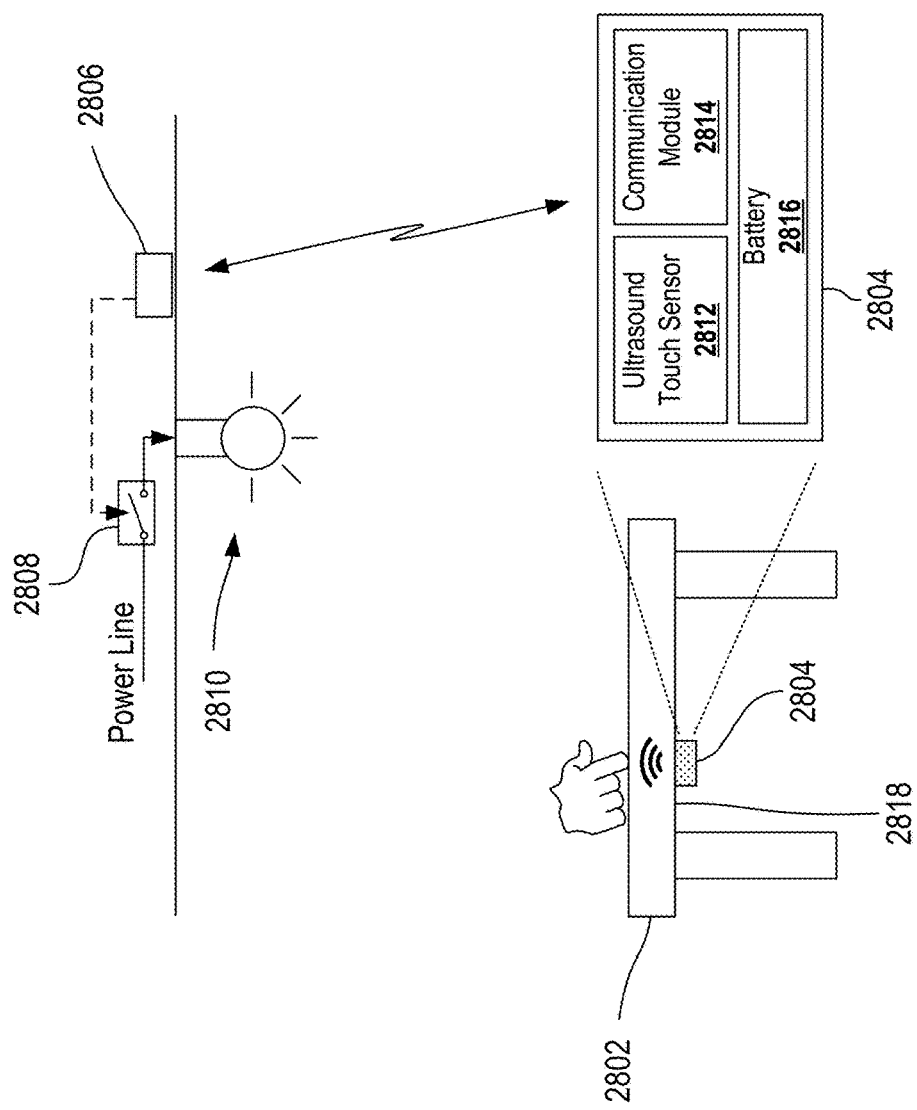
FIG. 28 is a schematic diagram depicting a piece of furniture using an ultrasound input device according to certain aspects of the present disclosure.

FIG. 28 is a schematic diagram depicting a piece of furniture 2802 using an ultrasound input device 2804 according to certain aspects of the present disclosure. The ultrasound input device 2804 can be coupled to the furniture 2802 in any suitable fashion. A user touching the furniture 2802 at or adjacent to the location of the ultrasound input device 2804 can be detected by the ultrasound input device 2804 (e.g., via ultrasound touch sensor 2812). Upon detecting touch, the ultrasonic input device 2804 can perform any preprogrammed functions. For example, a communication module 2814 of the ultrasonic input device 2804 can send a signal (e.g., a wireless signal) to a control module 2806 spaced apart from the ultrasonic input device 2804 and/or the furniture 2802. The control module 2806 can control another device, such as a power switch 2808 coupled to a light bulb 2810. Thus, upon pressing a location on the furniture 2802 that is at or adjacent to the location of the ultrasound input device 2804, the light bulb 2810 can be turned on, be turned off, or otherwise be controlled. The device being controlled (e.g., light bulb 2810) can be in the same environment as the ultrasound input device 2804, although that need not always be the case. In some cases, the device being controlled can be in an adjacent environment or even a distant environment.

The ultrasound input device 2804 according to certain aspects of the present disclosure can operate on very low power, such as from an internal battery 2816. This battery-powered, low power operation can permit use of the ultrasound input device 2804 in otherwise inaccessible or inconvenient locations. For example, a light switch can be incorporated into a table or desk, or a television remote can be incorporated into an armrest of a chair.

In some cases, an ultrasound input device 2804 can be positioned on a hidden surface 2818 so as to hide the ultrasound input device 2804 from sight during normal operation. A hidden surface 2818 can be an underside of a table (e.g., furniture 2802), the inside of a piece of furniture, the inside of a wall, or any other suitable location hidden from view. Thus, the hidden ultrasound input device can be actuated only by those knowing its location, which would otherwise be hidden from view.

VI. Additional Piezoelectric Array Designs

Figure 29:
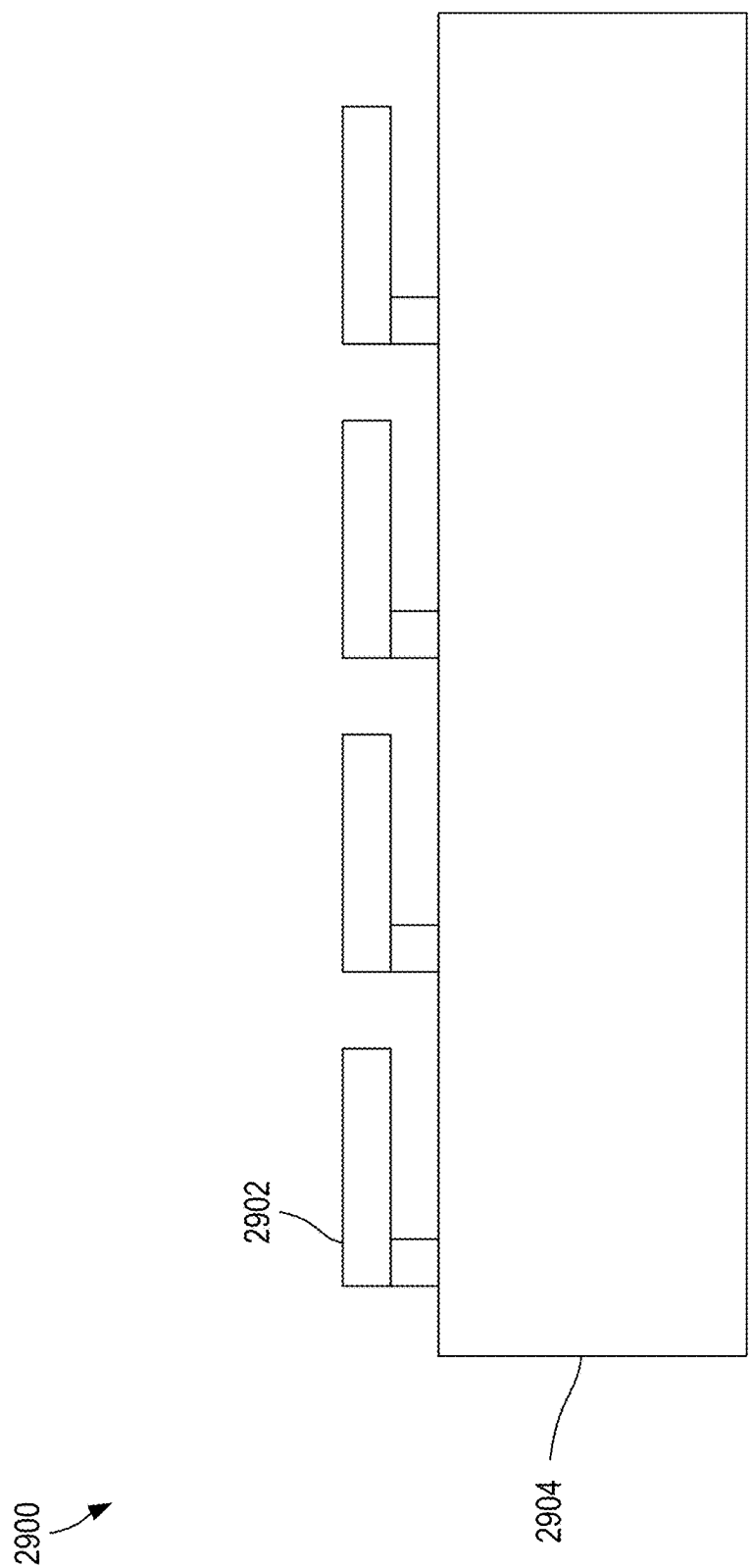
FIG. 29 is a schematic diagram of a piezoelectric resonator array containing piezoelectric cantilevers usable in an ultrasound input device according to certain aspects of the present disclosure.

FIG. 29 is a schematic diagram of a piezoelectric resonator array 2900 containing piezoelectric cantilevers 2902 usable in an ultrasound input device according to certain aspects of the present disclosure. The piezoelectric resonator array 2900 can contain a set of piezoelectric cantilevers 2902 on a base 2904. A piezoelectric resonator array 2900, when acoustically coupled to a material layer (e.g., material layer 102 of FIG. 1) can operate with a particular acoustic resonance. When a touch event is occurring, the touch event can cause the piezoelectric resonator array 2900 to resonate differently. This change in acoustic resonance due to the touch event can be detected and used as a sensor signal in an ultrasonic input device, such as instead of a PMUT. Additionally, the piezoelectric cantilevers 2902 can be driven to flex and thus induce emitted signals.

Figure 30:
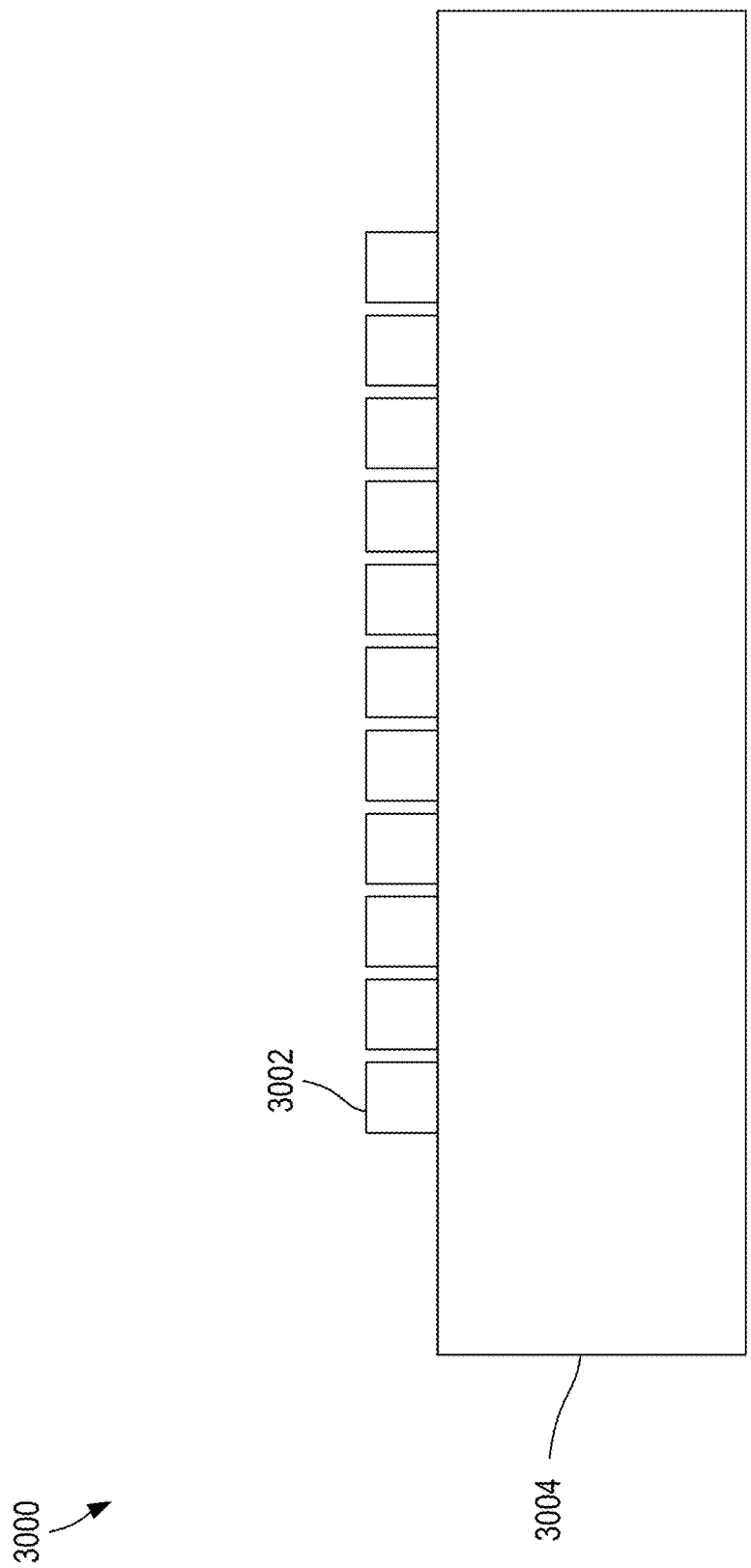
FIG. 30 is a schematic diagram of a piezoelectric resonator array containing piezoelectric pillars usable in an ultrasound input device according to certain aspects of the present disclosure.

FIG. 30 is a schematic diagram of a piezoelectric resonator array 3000 containing piezoelectric pillars 3002 usable in an ultrasound input device according to certain aspects of the present disclosure. The piezoelectric resonator array 3000 can contain a set of piezoelectric pillars 3002 on a base 3004. A piezoelectric resonator array 3000, when acoustically coupled to a material layer (e.g., material layer 102 of FIG. 1) can operate with a particular acoustic resonance. When a touch event is occurring, the touch event can cause the piezoelectric resonator array 3000 to resonate differently. This change in acoustic resonance due to the touch event can be detected and used as a sensor signal in an ultrasonic input device, such as instead of a PMUT. Additionally, the piezoelectric pillars 3002 can be driven to flex and thus induce emitted signals. The piezoelectric pillars 3002 can be arranged in any suitable pattern, such as a hexagonal grid.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

As used below, any reference to a series of examples is to be understood as a reference to each of those examples disjunctively (e.g., "Examples 1-4" is to be understood as "Examples 1, 2, 3, or 4").

Example 1 is a method comprising: emitting, by a transducer coupled to a first surface of a material layer that has a distance between the first surface and a second surface, an ultrasonic signal directed toward the second surface; detecting, by the transducer, a reflected ultrasonic signal; determining an amplitude of the reflected ultrasonic signal; determining the amplitude is less than a threshold associated with a portion of the ultrasonic signal penetrating the second surface; and when the amplitude is less than the threshold, generating a signal indicating a touch input on the second surface.

Example 2 is the method of example(s) 1, further comprising: detecting, by the transducer, an additional reflected ultrasonic signal, wherein the additional reflected ultrasonic signal is associated with an echo of the reflected ultrasonic signal; determining an additional amplitude of the additional reflected ultrasonic signal; and updating the amplitude by adding the additional amplitude prior to determining the amplitude is less than the threshold.

Example 3 is the method of example(s) 1 or 2, wherein the ultrasonic signal comprises a first frequency and a second frequency, and the method further comprises: determining a first amplitude associated with the first frequency and a second amplitude associated with the second frequency; determining the first amplitude and the second amplitude are less than the threshold; and when the first amplitude and the second amplitude are less than the threshold, generating the signal indicating an input touch on the second surface.

Example 4 is the method of example(s) 1-3, wherein the material layer comprises at least one or more of glass, metal, leather, wood, ceramic, plastic, and stone.

Example 5 is the method of example(s) 1-4, wherein determining the amplitude of the reflected ultrasonic signal comprises one of: rectifying and integrating the detected ultrasonic signal; accumulating absolute values of the detected ultrasonic signal; and squaring and integrating the detected ultrasonic signal.

Example 6 is the method of example(s) 5, wherein determining the amplitude of the reflected ultrasonic signal further comprises applying an energy measurement window envelope to the reflected ultrasonic signal.

Example 7 is the method of example(s) 5 or 6, wherein determining the amplitude of the reflected ultrasonic signal comprises accumulating absolute values of the detected ultrasonic signal, and wherein accumulating absolute values of the detected ultrasonic signal comprises applying a negative clocked direct current charge to a switch-capacitor analog accumulator.

Example 8 is the method of example(s) 1-7, wherein determining the amplitude of the reflected ultrasonic signal is performed by analog circuitry of an application specific integrated circuit coupled to the transducer.

Example 9 is the method of example(s) 1-8, further comprising: calculating a moving average of the amplitude of the reflected ultrasonic signal; and calculating the threshold based on the moving average.

Example 10 is a method comprising: emitting, by a transducer coupled to a first surface of a material layer that has a distance between the first surface and a second surface, an ultrasonic signal directed toward the second surface; detecting, by the transducer, a reflected ultrasonic signal; determining an energy value associated with the reflected ultrasonic signal; determining the energy value is less than a threshold associated with a portion of the ultrasonic signal penetrating the second surface; and when the energy value is less than the threshold, generating a signal indicating a touch input on the second surface.

Example 11 is the method of example(s) 10, further comprising detecting, by the transducer, an additional reflected ultrasonic signal, wherein the additional reflected ultrasonic signal is associated with an echo of the reflected ultrasonic signal, wherein the energy value is further associated with the additional reflected ultrasonic signal.

Example 12 is the method of example(s) 10 or 11, wherein determining the energy value is performed by analog circuitry of an application specific integrated circuit coupled to the transducer.

Example 13 is the method of example(s) 10-12, wherein determining the energy value comprises: rectifying the reflected ultrasonic signal to provide a rectified signal; integrating a portion of the rectified signal to provide an integrated signal; and measuring, by an analog to digital converter, the integrated signal to determine the energy value.

Example 14 is the method of example(s) 10-12, wherein determining the energy value comprises: calculating absolute values of the detected reflected ultrasonic signal; accumulating the absolute values associated with the detected reflected ultrasonic signal to provide an accumulated signal; and measuring, by an analog to digital converter, the accumulated signal to determine the energy value.

Example 15 is the method of example(s) 10-12, wherein determining the energy value comprises: squaring the detected reflected ultrasonic signal by passing the reflected ultrasonic signal through a self-mixing circuit to provide a squared signal; integrating the squared signal to provide an integrated signal; and measuring, by an analog to digital converter, the integrated signal to determine the energy value.

Example 16 is the method of example(s) 10-15, further comprising: calculating a moving average of the amplitude of the reflected ultrasonic signal; and calculating the threshold based on the moving average.

Example 17 is a device comprising: a body comprising an interior surface and an exterior surface; a transducer coupled to the interior surface; a circuit coupled with the transducer and configured to: emit an ultrasonic signal directed toward the exterior surface; detect, using the transducer, a set of at least one reflected ultrasonic signal; determine an amplitude of the set of at least one reflected ultrasonic signal; determine the amplitude is less than a threshold, wherein the threshold is associated with a portion of the at least one ultrasonic signal penetrating the exterior surface; and when the amplitude is less than the threshold, generate a signal indicating a touch input on the exterior surface.

Example 18 is the device of claim 17, wherein the set of at least one reflected ultrasonic signal includes a first reflected ultrasonic signal and a second reflected ultrasonic signal, wherein the second reflected ultrasonic signal is associated with an echo of the first reflected ultrasonic signal.

Example 19 is the device of example(s) 17 or 18, wherein the device comprises a mobile phone.

Example 20 is the device of example(s) 17-19, wherein the device comprises at least one or more of a steering wheel, an infotainment input, a console control a keypad.

Example 21 is the device of example(s) 17-20, wherein the body comprises at least one or more of glass, metal, leather, wood, and stone.

Example 22 is the device of example(s) 17, 18, or 20-21, wherein the device comprises a robot finger input device.

Example 23 is the device of example(s) 17-22, wherein the circuit comprises one or more processors and a memory coupled to the transducer, wherein the memory includes a plurality of instructions for detecting the touch input that, when executed by the one or more processors cause the device to perform the steps the circuit is configured to perform.

Example 24 is the device of example(s) 17-23, further comprising an additional transducer coupled to the interior surface, wherein the circuit is further coupled to the additional transducer and configured to: emit an additional ultrasonic signal directed toward the exterior surface; detect, using the additional transducer, an additional reflected ultrasonic signal associated with the additional ultrasonic signal; determine an additional amplitude of the additional reflected ultrasonic signal; determine the additional amplitude is less than an additional threshold, wherein the additional threshold is associated with a portion of the additional ultrasonic signal penetrating the exterior surface; and generate the signal indicating the touch input on the exterior surface when the additional amplitude is less than the additional threshold and when the amplitude is less than the threshold.

Example 25 is the device of example(s) 24, wherein the additional ultrasonic signal has a different frequency than the ultrasonic signal.

Example 26 is the device of example(s) 24 or 25, wherein the transducer and the additional transducer are concentric.

Example 27 is the device of example(s) 24-26, wherein the transducer and the additional transducer are coupled to a single circuit board.

Example 28 is the device of example(s) 17-27, wherein the transducer is a piezoelectric micromachined ultrasonic transducer.

Example 29 is the device of example(s) 17-28, wherein the transducer comprises a plurality of channels including a set of transmitting channels and at least one receiving channel, wherein the at least one receiving channel is positioned between a subset of the set of transmitting channels.

Example 30 is the device of example(s) 17-29, wherein the circuit comprises an application specific integrated circuit comprising analog circuitry, and wherein determining the amplitude is performed using the analog circuitry of the application specific integrated circuit.

What is claimed is:

1. A method comprising:
   emitting, by a transducer coupled to a first surface of a material layer that has a distance between the first surface and a second surface, an ultrasonic signal directed toward the second surface;
   detecting, by the transducer, at least one reflected ultrasonic signal;
   determining an amplitude of the at least one reflected ultrasonic signal, wherein determining the amplitude of the at least one reflected ultrasonic signal comprises inputting a negative direct current signal and the at least one reflected ultrasonic signal to an accumulation circuit;
   determining the amplitude is less than a threshold associated with a portion of the ultrasonic signal penetrating the second surface; and
   when the amplitude is less than the threshold, generating a signal indicating a touch input on the second surface.

2. The method of claim 1, further comprising:
   detecting, by the transducer, at least one additional reflected ultrasonic signal, wherein the at least one additional reflected ultrasonic signal is associated with an echo of the at least one reflected ultrasonic signal;
   determining an additional amplitude of the at least one additional reflected ultrasonic signal; and updating the amplitude by adding the additional amplitude prior to determining the amplitude is less than the threshold.

3. The method of claim 1, wherein the ultrasonic signal comprises a first frequency and a second frequency, and the method further comprises:
determining a first amplitude associated with the first frequency and a second amplitude associated with the second frequency;
determining the first amplitude and the second amplitude are less than the threshold; and
when the first amplitude and the second amplitude are less than the threshold, generating the signal indicating an input touch on the second surface.

4. The method of claim 1, wherein the material layer comprises at least one or more of glass, metal, leather, wood, ceramic, plastic, and stone.

5. The method of claim 1, wherein determining the amplitude of the at least one reflected ultrasonic signal comprises one of:
rectifying and integrating the at least one reflected ultrasonic signal;
accumulating absolute values of the at least one reflected ultrasonic signal; and
squaring and integrating the at least one reflected ultrasonic signal.

6. The method of claim 5, wherein determining the amplitude of the at least one reflected ultrasonic signal further comprises applying an energy measurement window envelope to the at least one reflected ultrasonic signal.

7. The method of claim 5, wherein determining the amplitude of the at least one reflected ultrasonic signal comprises accumulating absolute values of the at least one reflected ultrasonic signal, and wherein accumulating absolute values of the at least one reflected ultrasonic signal comprises inputting the negative direct current signal as a negative clocked direct current charge to a switch-capacitor analog accumulator.

8. The method of claim 1, wherein determining the amplitude of the at least one reflected ultrasonic signal is performed by analog circuitry of an application specific integrated circuit coupled to the transducer.

9. The method of claim 1, further comprising:
calculating a moving average of the amplitude of the at least one reflected ultrasonic signal; and
calculating the threshold based on the moving average.

10. A method comprising:
emitting, by a transducer coupled to a first surface of a material layer that has a distance between the first surface and a second surface, an ultrasonic signal directed toward the second surface;
detecting, by the transducer, at least one reflected ultrasonic signal;
determining an energy value associated with the at least one reflected ultrasonic signal, wherein determining the energy value of the at least one reflected ultrasonic signal comprises inputting a negative bias current and the at least one reflected ultrasonic signal to an integration circuit;
determining the energy value is less than a threshold associated with a portion of the ultrasonic signal penetrating the second surface; and
when the energy value is less than the threshold, generating a signal indicating a touch input on the second surface.

11. The method of claim 10, further comprising detecting, by the transducer, at least one additional reflected ultrasonic signal, wherein the at least one additional reflected ultrasonic signal is associated with an echo of the at least one reflected ultrasonic signal, wherein the energy value is further associated with the at least one additional reflected ultrasonic signal.

12. The method of claim 10, wherein determining the energy value is performed by analog circuitry of an application specific integrated circuit coupled to the transducer.

13. The method of claim 10, wherein determining the energy value comprises:
rectifying the at least one reflected ultrasonic signal to provide a rectified signal;
integrating a portion of the rectified signal to provide an integrated signal; and
measuring, by an analog to digital converter, the integrated signal to determine the energy value.

14. The method of claim 10, wherein determining the energy value comprises:
calculating absolute values of the at least one reflected ultrasonic signal;
accumulating the absolute values associated with the at least one reflected ultrasonic signal to provide an accumulated signal; and
measuring, by an analog to digital converter, the accumulated signal to determine the energy value.

15. The method of claim 10, wherein determining the energy value comprises:
squaring the at least one reflected ultrasonic signal by passing the at least one reflected ultrasonic signal through a self-mixing circuit to provide a squared signal;
integrating the squared signal to provide an integrated signal; and
measuring, by an analog to digital converter, the integrated signal to determine the energy value.

16. The method of claim 10, further comprising:
calculating a moving average of the energy value of the at least one reflected ultrasonic signal; and
calculating the threshold based on the moving average.

17. A device comprising:
a body comprising an interior surface and an exterior surface;
a transducer coupled to the interior surface;
a circuit coupled with the transducer and configured to:
emit an ultrasonic signal directed toward the exterior surface;
detect, using the transducer, a set of at least one reflected ultrasonic signal;
determine an amplitude of the set of at least one reflected ultrasonic signal, wherein determining the amplitude of the set of at least one reflected ultrasonic signal comprises inputting a negative direct current signal and the set of at least one reflected ultrasonic signal to an accumulation circuit;
determine the amplitude is less than a threshold, wherein the threshold is associated with a portion of the ultrasonic signal penetrating the exterior surface; and
when the amplitude is less than the threshold, generate a signal indicating a touch input on the exterior surface.

18. The device of claim 17, wherein the set of at least one reflected ultrasonic signal includes a first reflected ultrasonic signal and a second reflected ultrasonic signal, wherein the second reflected ultrasonic signal is associated with an echo of the first reflected ultrasonic signal.

19. The device of claim 17, wherein the device comprises a mobile phone.

20. The device of claim 17, wherein the device comprises at least one or more of a steering wheel, an infotainment input, a console control a keypad.

21. The device of claim 17, wherein the body comprises at least one or more of glass, metal, leather, wood, and stone.

22. The device of claim 17, wherein the device comprises a robot finger input device.

23. The device of claim 17, wherein the circuit comprises one or more processors and a memory coupled to the transducer, wherein the memory includes a plurality of instructions for detecting the touch input that, when executed by the one or more processors cause the device to perform the steps the circuit is configured to perform.

24. The device of claim 17, further comprising an additional transducer coupled to the interior surface, wherein the circuit is further coupled to the additional transducer and configured to:
- emit an additional ultrasonic signal directed toward the exterior surface;
- detect, using the additional transducer, an additional reflected ultrasonic signal associated with the additional ultrasonic signal;
- determine an additional amplitude of the additional reflected ultrasonic signal;
- determine the additional amplitude is less than an additional threshold, wherein the additional threshold is associated with a portion of the additional ultrasonic signal penetrating the exterior surface; and
- generate the signal indicating the touch input on the exterior surface when the additional amplitude is less than the additional threshold and when the amplitude is less than the threshold.

25. The device of claim 24, wherein the additional ultrasonic signal has a different frequency than the ultrasonic signal.

26. The device of claim 24, wherein the transducer and the additional transducer are concentric.

27. The device of claim 24, wherein the transducer and the additional transducer are coupled to a single circuit board.

28. The device of claim 17, wherein the transducer is a piezoelectric micromachined ultrasonic transducer.

29. The device of claim 17, wherein the transducer comprises a plurality of channels including a set of transmitting channels and at least one receiving channel, wherein the at least one receiving channel is positioned between a subset of the set of transmitting channels.

30. The device of claim 17, wherein the circuit comprises an application specific integrated circuit comprising analog circuitry, and wherein determining the amplitude is performed using the analog circuitry of the application specific integrated circuit.

* * * * *